US009357195B2

(12) United States Patent
Chen et al.

(10) Patent No.: US 9,357,195 B2
(45) Date of Patent: May 31, 2016

(54) INTER-VIEW PREDICTED MOTION VECTOR FOR 3D VIDEO

(71) Applicant: QUALCOMM Incorporated, San Diego, CA (US)

(72) Inventors: Ying Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/968,362

(22) Filed: Aug. 15, 2013

(65) Prior Publication Data

US 2014/0049605 A1    Feb. 20, 2014

Related U.S. Application Data

(60) Provisional application No. 61/684,100, filed on Aug. 16, 2012.

(51) Int. Cl.
*H04N 19/00* (2014.01)
*H04N 13/00* (2006.01)
(Continued)

(52) U.S. Cl.
CPC ........... *H04N 13/0003* (2013.01); *H04N 19/52* (2014.11); *H04N 19/597* (2014.11)

(58) Field of Classification Search
CPC .. H04N 19/52; H04N 19/597; H04N 13/0003
See application file for complete search history.

(56) References Cited

U.S. PATENT DOCUMENTS

| 8,879,857 | B2 | 11/2014 | Raveendran et al. |
| 2010/0158120 | A1 | 6/2010 | Fang et al. |

(Continued)

FOREIGN PATENT DOCUMENTS

| TW | I353181 B | 11/2011 |
| TW | I355204 B | 12/2011 |

(Continued)

OTHER PUBLICATIONS

An et al., "3D-CE5.h related: Inter-view motion prediction for HEVC-based 3D video coding," CT-3V Meeting; MPEG Meeting; Stockholm; (The Joint Collaborative Team on 3D Video Coding Extension Development of ISO/IEC JTC1/SC29/WG11 and ITU-T SG.16 ); URL: http://phenix.int-evry.fr/jct2, No. JCT3V-A0049, Jul. 16-20, 2012, 6 pp.

(Continued)

*Primary Examiner* — Jeffery Williams
(74) *Attorney, Agent, or Firm* — Shumaker & Sieffert, P.A.

(57) ABSTRACT

A video coder determines a first picture order count (POC) value of a first reference picture associated with a first motion vector of a corresponding block that points in a first direction and determines whether a first reference picture list for the current block includes a reference picture having the first POC value; in response to the reference picture list not including the reference picture having the first POC value, determines a second POC value of a second reference picture associated with a second motion vector of the corresponding block that points in a second direction, determines whether the first reference picture list for the current block includes a reference picture having the second POC value and in response to the first reference picture list including the reference picture having the second POC value, decodes the current motion vector using the second motion vector of the corresponding block.

48 Claims, 9 Drawing Sheets

(51) Int. Cl.
H04N 19/597 (2014.01)
H04N 19/52 (2014.01)

(56) References Cited

U.S. PATENT DOCUMENTS

| | | | |
|---|---|---|---|
| 2012/0106634 A1 | 5/2012 | Jeon et al. | |
| 2013/0077678 A1 | 3/2013 | Chen et al. | |
| 2013/0089152 A1 | 4/2013 | Wang et al. | |
| 2015/0124877 A1* | 5/2015 | Choi | H04N 19/597 375/240.12 |

FOREIGN PATENT DOCUMENTS

| | | |
|---|---|---|
| TW | I355205 | 12/2011 |
| WO | 2007038724 | 4/2007 |
| WO | 2013006386 A1 | 1/2013 |
| WO | 2013043892 A2 | 3/2013 |

OTHER PUBLICATIONS

Schwarz et al., "Test Model under Consideration for HEVC based 3D video coding," MPEG Meeting; San Jose, CA; (Motion Picture Expert Group or ISO/IEC JTC1/SC29/WG11), No. N12559, Feb. 2012, 45 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2013/055406—The International Bureau of WIPO—Geneva, Switzerland, Nov. 7, 2014, 8 pp.

International Search Report and Written Opinion—PCT/US2013/055406—ISA/EPO—Nov. 11, 2012, 11 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Office Action and Search Report, and translation thereof, from counterpart Taiwan Patent Application No. 102129557, Feb. 4, 2015, 6 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Bross et al., "Editors' proposed corrections to HEVC version 1," Joint Collaborative Team on Video Coding (JCT-VC) of ITU-T SG 16 WP 3 and ISO/IEC JTC 1/SC 29/WG 11, JCTVC-M0432_v3, Apr. 18-26, 2013, 310 pp.

Second Written Opinion of International Application No. PCT/US2013/055406, mailed Jul. 14, 2014, 7 pp.

* cited by examiner

INTER-VIEW PREDICTED MOTION VECTOR FOR 3D VIDEO

This application claims the benefit of U.S. Provisional Application No. 61/684,100, filed 16 Aug. 2012, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improving coding efficiency of motion prediction in multiview and 3D video coding.

In one example, this disclosure describes a method of decoding multiview video data that includes determining, for a current block in a current view, a corresponding block in a reference view using a disparity vector for the current block; determining a first direction for a current motion vector of the current block, wherein the first direction corresponds to one of a first reference picture list or a second reference picture list; determining a first picture order count (POC) value of a first reference picture referenced by a reference index associated with a first motion vector of the corresponding block that points in the first direction; determining whether a first reference picture list for the current block includes a reference picture having the first POC value, wherein the first reference picture list corresponds to the first direction as a directional motion predictor; in response to the first reference picture list including the reference picture having the first POC value, decoding the current motion vector using the first motion vector of the corresponding block; and, in response to the first reference picture list not including the reference picture having the first POC value: determining a second POC value of a second reference picture referenced by a reference index associated with a second motion vector of the corresponding block that points in a second direction, wherein the second direction is different than the first direction, wherein the second direction corresponds to the other of the first reference picture list and the second reference picture list, determining whether the first reference picture list for the current block includes a reference picture having the second POC value; and in response to the first reference picture list including the reference picture having the second POC value, decoding the current motion vector using the second motion vector of the corresponding block as the directional motion predictor.

In another example, a device for video coding includes a video coder configured to determine, for a current block in a current view, a corresponding block in a reference view using a disparity vector for the current block; determine a first direction for a current motion vector of the current block, wherein the first direction corresponds to one of a first reference picture list or a second reference picture list; determine a first picture order count (POC) value of a first reference picture referenced by a reference index associated with a first motion vector of the corresponding block that points in the first direction; determine whether a first reference picture list for the current block includes a reference picture having the first POC value, wherein the first reference picture list corresponds to the first direction; in response to the first reference picture list including the reference picture having the first POC value, decode the current motion vector using the first motion vector of the corresponding block as a directional motion predictor; in response to the first reference picture list not including the reference picture having the first POC value: determine a second POC value of a second reference picture referenced by a reference index associated with a second motion vector of the corresponding block that points in a second direction, wherein the second direction is different than the first direction, wherein the second direction corresponds to the other of the first reference picture list and the second reference picture list; determine whether the first reference picture list for the current block includes a reference picture having the second POC value; and in response to the first reference picture list including the reference picture having the second POC value, decode the current motion vector using the second motion vector of the corresponding block as the directional motion predictor.

In another example, a device for video coding includes a video encoder configured to determine, for a current block in a current view, a corresponding block in a reference view using a disparity vector for the current block; determine a first direction for a current motion vector of the current block, wherein the first direction corresponds to one of a first reference picture list or a second reference picture list; determine a first picture order count (POC) value of a first reference picture referenced by a reference index associated with a first motion vector of the corresponding block that points in the first direction; determine whether a first reference picture list for the current block includes a reference picture having the first POC value, wherein the first reference picture list corresponds to the first direction; in response to the first reference picture list including the reference picture having the first POC value, encode the current motion vector using the first motion vector of the corresponding block as a directional motion predictor; in response to the first reference picture list not including the reference picture having the first POC value: determine a second POC value of a second reference picture referenced by a reference index associated with a second motion vector of the corresponding block that points in a second direction, wherein the second direction is different than the first direction, wherein the second direction corresponds to the other of the first reference picture list and the second reference picture list; determine whether the first reference picture list for the current block includes a reference picture having the second POC value; and in response to the first reference picture list including the reference picture having the second POC value, encode the current motion vector using the second motion vector of the corresponding block as the directional motion predictor.

In another example, an apparatus for coding video data includes means for determining, for a current block in a current view, a corresponding block in a reference view using a disparity vector for the current block; means for determining a first direction for a current motion vector of the current block, wherein the first direction corresponds to one of a first reference picture list or a second reference picture list; means for determining a first picture order count (POC) value of a first reference picture referenced by a reference index associated with a first motion vector of the corresponding block that points in the first direction; means for determining whether a first reference picture list for the current block includes a reference picture having the first POC value, wherein the first reference picture list corresponds to the first direction; means for coding the current motion vector using the first motion vector of the corresponding block as a directional motion predictor in response to the first reference picture list including the reference picture having the first POC value; means for determining a second POC value of a second reference picture referenced by a reference index associated with a second motion vector of the corresponding block that points in a second direction in response to the first reference picture list not including the reference picture having the first POC value, wherein the second direction is different than the first direction, wherein the second direction corresponds to the other of the first reference picture list and the second reference picture list; means for determining whether the first reference picture list for the current block includes a reference picture having the second POC value; and means for coding the current motion vector using the second motion vector of the corresponding block as the directional motion predictor in response to the first reference picture list including the reference picture having the second POC value.

In another example, a computer-readable storage medium stores instructions that when executed by one or more processors cause the one or more processors to determine, for a current block in a current view, a corresponding block in a reference view using a disparity vector for the current block; determine a first direction for a current motion vector of the current block, wherein the first direction corresponds to one of a first reference picture list or a second reference picture list; determine a first picture order count (POC) value of a first reference picture referenced by a reference index associated with a first motion vector of the corresponding block that points in the first direction; determine whether a first reference picture list for the current block includes a reference picture having the first POC value, wherein the first reference picture list corresponds to the first direction; code the current motion vector using the first motion vector of the corresponding block as a directional motion predictor in response to the first reference picture list including the reference picture having the first POC value; and in response to the first reference picture list not including the reference picture having the first POC value: determine a second POC value of a second reference picture referenced by a reference index associated with a second motion vector of the corresponding block that points in a second direction, wherein the second direction is different than the first direction, wherein the second direction corresponds to the other of the first reference picture list and the second reference picture list; determine whether the first reference picture list for the current block includes a reference picture having the second POC value; and code the current motion vector using the second motion vector of the corresponding block as the directional motion predictor in response to the first reference picture list including the reference picture having the second POC value.

The details of one or more examples are set forth in the accompanying drawings and the description below. Other features, objects, and advantages will be apparent from the description and drawings, and from the claims.

DETAILED DESCRIPTION

Figure 1:
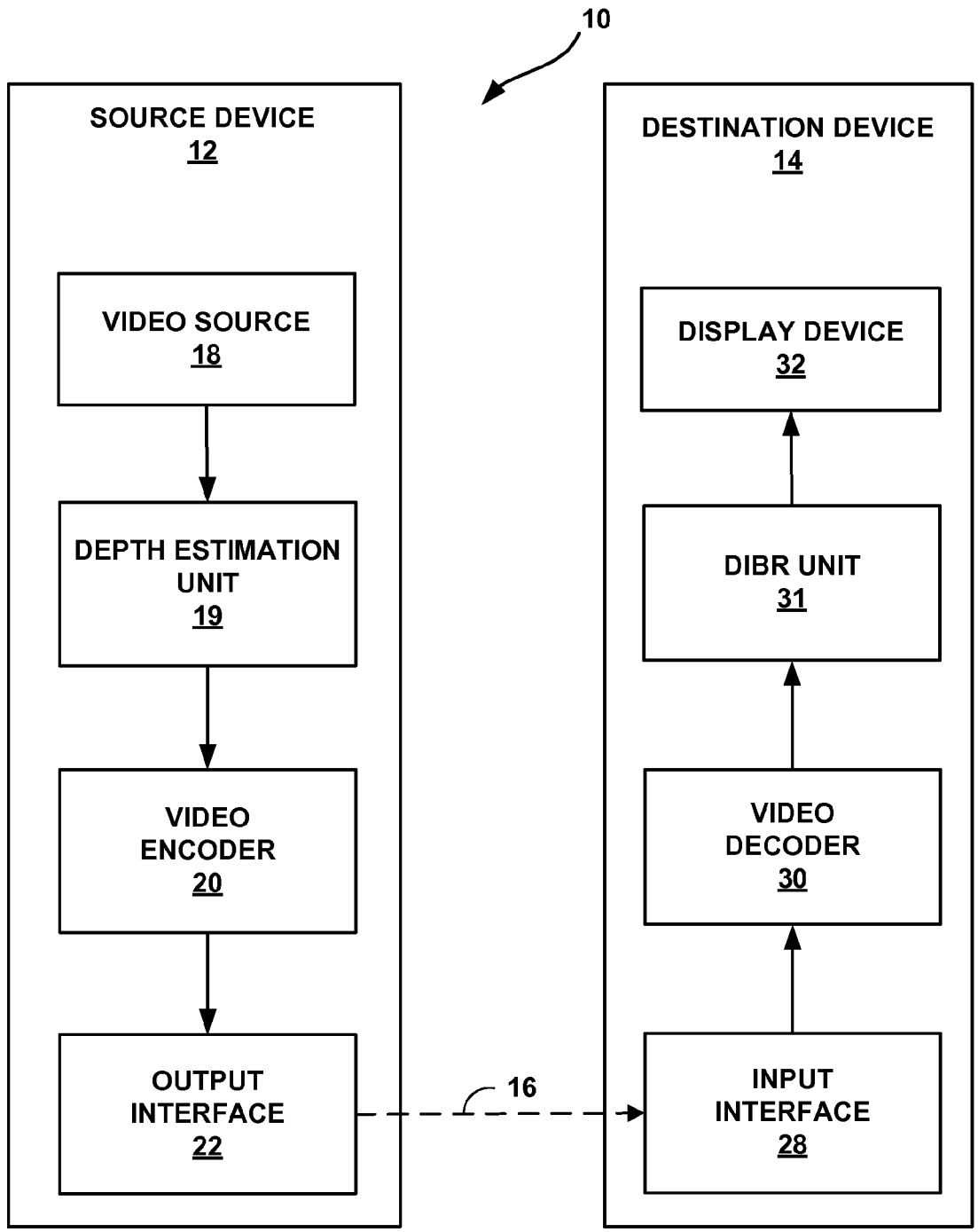
FIG. 1 is a block diagram illustrating an example video encoding and decoding system that may utilize the inter-prediction techniques of this disclosure.

This disclosure describes techniques related to the signaling of motion parameters in multiview video coding, including in the newly emerging three-dimensional High Efficiency Video Coding standard, commonly referred to as 3D HEVC. Video compression techniques can include predicting a current block of video data based on an already coded block of video data. In this disclosure, the term current block generally refers to a block of video data currently being coded (e.g., encoded or decoded), as opposed to video blocks that are already coded or video blocks that are yet to be coded. In an intra prediction mode, the current block is predicted based on one or more previously coded blocks in the same picture as the current block, while in an inter prediction mode the current block is predicted based on an already coded block in a different picture. The different picture may be either a picture of a different time instance from the same view as the current block or may be a picture from the same time instance but from a different view.

When a video decoder is to perform inter prediction for a given video block, motion parameters are signaled in an encoded video bitstream. The motion parameters define, for example, a motion vector, a reference picture index, and a prediction direction so that the video decoder can determine which block in which picture to use as the predictive block for the current block. A video coder may use various modes for signaling motion parameters in an encoded bitstream. In order to reduce the number of bits needed to implement inter-predictive coding, some of those modes may utilize prediction of motion parameters instead of explicit signaling of motion parameters. In the developing HEVC standard, there are various modes for the prediction of motion parameters, one of which is referred to as merge mode. In merge mode, a video coder constructs a candidate list of motion parameters (e.g., reference pictures and motion vectors) using as candidates motion parameters from neighboring blocks, including spatial neighboring blocks and temporal neighboring blocks, and in the case of 3D-HEVC also including inter-view neighboring blocks. The chosen motion parameters are signaled from a video encoder to a video decoder by transmitting an index of the selected candidate from the candidate list. At the video decoder, once the index is decoded, all the motion parameters of the corresponding block of the selected candidate are inherited. A video encoder and video decoder are configured to construct the same lists based on already coded blocks. Therefore, based on the index, the video decoder can identify the motion parameters of the candidate selected by the video encoder.

Another mode for predicting motion parameters is skip mode. Skip mode generally operates in the same manner described above for merge mode, but in skip mode, no residual data is added to the predicted block, whereas in merge mode, residual data is added to the predicted block. The constructing of a list and transmitting of an index to identify a candidate in the list described above with reference to merge mode is generally also performed in skip mode.

Another mode for predicting motion parameters is advanced motion vector prediction (AMVP) mode. In AMVP mode a candidate list of motion vector predictors for each motion hypothesis is derived based on the coded reference index. This list includes motion vectors of neighboring blocks that are associated with the same reference index as well as a temporal motion vector predictor which is derived based on the motion parameters of the neighboring block of the co-located block in a temporal reference picture. The chosen motion vectors are signaled by transmitting an index into the candidate list. In addition, the reference index values and motion vector differences are also signaled. In this disclosure, the term motion vector predictor is generally used to refer to any motion vector from which one or more motion vectors are predicted. In some instances, the motion vector predictor and the predicted motion vector may be identical, while in other instances the motion vector predictor and the predicted motion vector may be different. In AMVP mode, for example, the predicted motion vector corresponds to the motion vector predictor plus motion vector difference values. This disclosure also refers to the term directional motion predictor, which generally refers to a motion vector predictor associate with a particular direction (i.e. a particular reference picture list). In the case of bi-prediction, a motion vector predictor may include two directional motion predictors.

A disparity vector is generally used to identify the location of a block in an inter-view reference picture that corresponds to a current block of a current view. To derive a disparity vector (DV) for a current block, a technique called Neighboring Blocks based Disparity Vector (NBDV) derivation is used in some current versions of 3D-HEVC Test Model (3D-HTM). NBDV utilizes disparity motion vectors from spatial and temporal neighboring blocks of the current block. In NBDV, the disparity motion vectors of spatial or temporal neighboring blocks are checked in a fixed order. Once a disparity motion vector (i.e., a motion vector that points to an inter-view reference picture) is identified, the checking process is terminated and the identified disparity motion vector is converted to a DV for the current block. The DV can be used in inter-view motion prediction and/or inter-view residue prediction. If no disparity motion vector is found after checking all the pre-defined neighboring blocks, a zero DV may be used for inter-view motion prediction while inter-view residual prediction may be disabled for the corresponding prediction unit (PU).

Based on the DV, a new motion vector candidate, referred to as an inter-view predicted motion vector, if available, may be added to candidate lists for AMVP and skip/merge modes. The inter-view predicted motion vector, if available, is a temporal motion vector.

During either skip/merge or AMVP mode, there might be up to two inter-view predicted motion vectors, corresponding to RefPicList0 and RefPicList1 respectively. These two motion vectors are denoted as inter-view predicted motion vector 0 and inter-view predicted motion vector 1 respectively.

The current design of the inter-view predicted motion vector derivation process in HEVC based multiview/3DV coding, summarized above, has some potential shortcomings. As one example, in the current design of the merge/skip mode in 3D-HTM, when the reference picture of the corresponding block in one reference picture list X (with X being 0 or 1) is a temporal reference picture and its picture order count (POC) value is unequal to that of any entry in RefPicListLX but equal to that of one entry in RefPicListLY of current PU/CU, the corresponding motion vector is also considered as unavailable for RefPicListLY, especially when the prediction utilization flag of RefPicListLY is equal to 0. As another example, when the POC of the reference picture of the corresponding block is different from that of any entry of the reference picture list of the current CU/PU, the inter-view predicted motion vector is considered as unavailable. As yet another example, in the current design of the AMVP mode in 3D-HTM, the motion information of reference picture list 0 of the corresponding block is always first checked, regardless of whether the target reference picture list is 0 or 1.

This disclosure proposes various techniques that may improve the coding efficiency of an inter-view predicted motion vector in HEVC-based multiview or 3DV coding. According to one technique, in the skip/merge mode, if the corresponding block (located by a disparity vector) has a motion vector mvLX (with X being 0 or 1) referring to a temporal reference picture, it is used to predict not only the inter-view predicted motion vector X but also the inter-view predicted motion vector Y (with Y being equal to 1−X). In other words, if the corresponding block has motion vector mvL1, then typically (that is, using a video coder implemented according to conventional 3D-HTM), mvL1 is only used to predict inter-view predicted motion vector 1, and if inter-view predicted motion vector 1 is unavailable, then no inter-view predicted motion candidate is added to the skip/merge mode candidate list. Similarly, if the corresponding block has motion vector mvL0, then (again according to conventional 3D-HTM), mvL0 is only used to predict inter-view predicted motion vector 0, and if inter-view predicted motion vector 0 is unavailable, then no inter-view predicted motion candidate is added to the skip/merge mode candidate list. According to the techniques of this disclosure, however, if the corresponding block has motion vector mvL1 and if inter-view predicted motion vector 1 is unavailable, then the availability of another candidate (inter-predicted motion vector 0) can be checked, and if available, added to the candidate list. Similarly, if the corresponding block has motion vector mv0 and if inter-view predicted motion vector 0 is unavailable, then the availability of another candidate (inter-predicted motion vector 1) can be checked, and if available, added to the candidate list.

If mvLX refers to a reference picture which has the same POC value as any picture in RefPicListX of the current slice, mvLX is set to inter-view predicted motion vector X, and the target reference index is set to the first picture in RefPicListX which has the same POC as the reference picture mvLX refers to. Otherwise, if mvLY (where, again, Y=1−X) refers to a reference picture which has the same POC value as any picture in RefPicListX in the current slice, mvLY is set to inter-view predicted motion vector X, and the target reference index is set to the first picture in RefPicListX which has the same POC as the reference picture mvLY refers to.

According to another technique, in the AMVP mode, for a given target reference index refIdxLX, instead of first comparing the POC value of the picture referred by mvL0 and then that referred by the mvL1 of the corresponding block with the POC of RefPicListX[refIdxLX] (of the current slice), it is proposed to first compare the POC value of the picture referred by mvLX and then that referred by mvLY (with Y equal to 1−X). Once the inter-view predicted motion vector is found, the comparison process is terminated. When the comparison indicates that the POC value of RefPicListX [refIdxLX] is equal to the POC value of the picture referred by mvL0 or mvL1, the inter-view predicted motion vector is set available and set to mvL0 or mvL1.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device. Many of the techniques described in this disclosure can be performed by both video encoder 20 and video decoder 30. Therefore, for ease of explanation, video encoder 20 and video decoder 30 may at times jointly be referred to as video coder 20/30. Techniques described relative to video coder 20/30 may be performed either by video encoder 20 or video decoder 30.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video coding standard, such as the High Efficiency Video Coding (HEVC) standard presently under development, and may conform to the HEVC Test Model (HM).

A recent draft of the upcoming HEVC standard is described in document HCTVC-J1003, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, Sweden, Jul. 11, 2012 to Jul. 12, 2012, which, as of 15 Aug. 2013, is downloadable from http://phenix.int-evry.fr/jct/doc_end_user/documents/10_Stockholm/wg11/JCTVC-J1003-v8.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of 15 Aug. 2013, is downloadable from http://phenix.intevry.fr/jct/doc_end_user/documents/ 12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$_{th}$ Meeting, Incheon, KR, April 2013, which as of 15 Aug. 2013, is available from http://phenix.intevey.fr/jct/doc_end_user/documents/13_Incheon/wg11/JCTVC-M0432-v3.zip.

For purposes of illustration, the techniques of this disclosure are described primarily with respect to the 3DV extension of HEVC. However, it should be understood that these techniques may be applied to other standards for coding video data used to produce a three-dimensional effect as well.

A Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it is generally desired that there are only high-level syntax (HLS) changes relative to HEVC, such that no module in the CU/PU level in HEVC needs to be re-designed and can be fully reused for MV-HEVC. For 3D-HEVC, new coding tools, including those in coding at the unit/prediction unit level, for both texture and depth views may be included and supported. The latest software 3D-HTM for 3D-HEVC can be downloaded, as of 15 Aug. 2013, from the following link: https://hevc.h-hi.fraunhofer.de/svn/svn_HEVCSoftware/trunk/.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. In particular, the techniques of this disclosure are related to multiview and/or 3D video coding based on advanced codecs. In general, the techniques of this disclosure may be applied to any of a variety of different video coding standards. For example, these techniques may be applied to the multi-view video coding (MVC) extension of ITU-T H.264/AVC (advanced video coding), to a 3D video (3DV) extension of the upcoming HEVC standard (e.g., 3D-HEVC), or other coding standard.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Initially, example coding techniques of HEVC will be discussed. The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes plus DC and Planar modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or merge mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In this section, multiview and multiview plus depth coding techniques will be discussed. Initially, MVC techniques will be discussed. As noted above, MVC is an extension of ITU-T H.264/AVC. In MVC, data for a plurality of views is coded in time-first order, and accordingly, the decoding order arrangement is referred to as time-first coding. In particular, view components (that is, pictures) for each of the plurality of views at a common time instance may be coded, then another set of view components for a different time instance may be coded, and so on. An access unit may include coded pictures of all of the views for one output time instance. It should be understood that the decoding order of access units is not necessarily identical to the output (or display) order.

Figure 2:
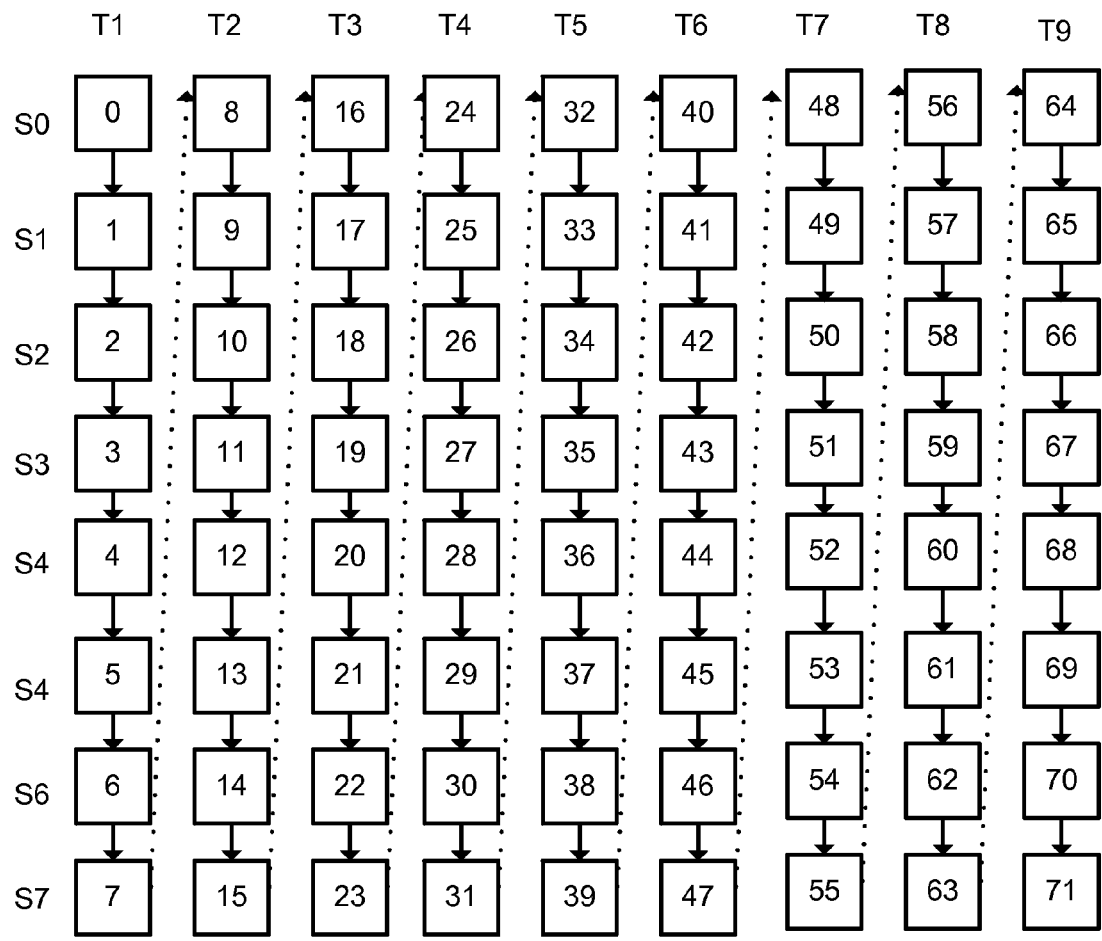
FIG. 2 is a conceptual diagram illustrating an example decoding order for multi-view video.

FIG. 2 shows a typical MVC decoding order (i.e., bitstream order). The decoding order arrangement is referred to as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component consists of a texture view component and a depth view component.

texture view component: A coded representation of the texture of a view in a single access unit.

depth view component: A coded representation of the depth of a view in a single access unit.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
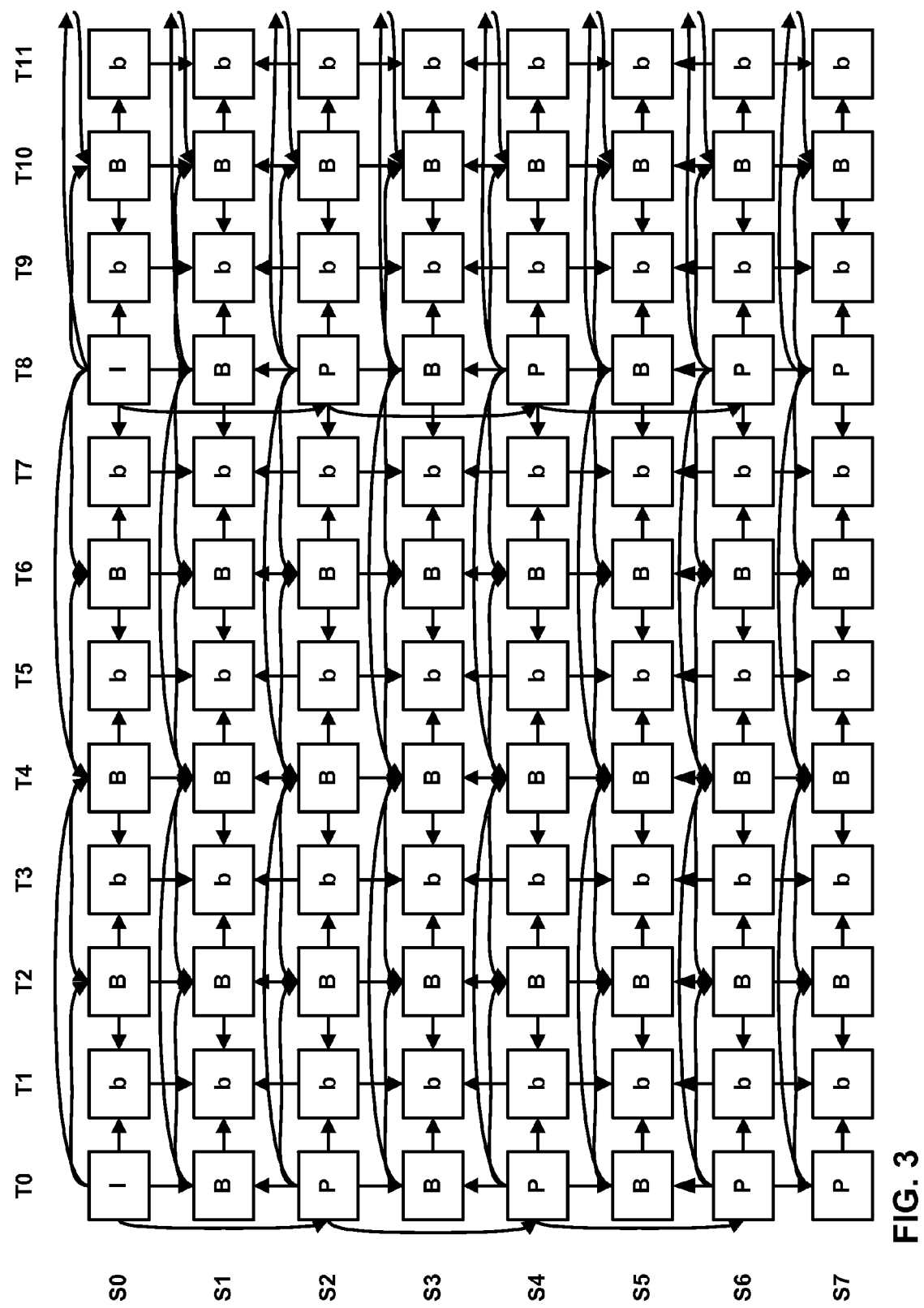
FIG. 3 is a conceptual diagram illustrating an example prediction structure for multi-view video.

FIG. 3 shows a typical MVC prediction structure (including both inter-picture prediction within each view and inter-view prediction) for multi-view video coding. Prediction directions in FIG. 3 are indicated by arrows, with the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, six views (having view IDs "S0" through "S5") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views could also be supported also MVC. One of the advantages of MVC is that an MVC encoder could take more than two views as a 3D video input and an MVC decoder can decode such a multiview representation. As such, any renderer with an MVC decoder may expect 3D video contents with more than two views.

In MVC, inter-view prediction is allowed among pictures in the same access unit (i.e., with the same time instance). When coding a picture in one of the non-base views, a picture may be added into a reference picture list if it is in a different view, but within the same time instance. An inter-view reference picture can be put in any position of a reference picture list, just like any inter prediction reference picture. As shown in FIG. 3, a view component can use the view components in other views for reference. In MVC, inter-view prediction is realized as if the view component in another view was an inter-prediction reference.

The following describes some relevant HEVC techniques relating to inter-prediction that may be used with multiview coding and/or multiview coding (MV-HEVC) with depth (3D-HEVC). The first technique for discussion is reference picture list construction for inter-prediction.

Coding a PU using inter-prediction involves calculating a motion vector between a current block (e.g., PU) and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel position. Upon finding a portion of the reference frame that best matches the current portion, the encoder determines the current motion vector for the current block as the difference in the location from the current block to the matching portion in the reference frame (e.g., from the center of the current block to the center of the matching portion).

In some examples, an encoder may signal the motion vector for each block in the encoded video bitstream. The signaled motion vector is used by the decoder to perform motion compensation in order to decode the video data. However, signaling the original motion vector directly may result in less efficient coding, as a large number of bits are typically needed to convey the information.

In some instances, rather than directly signaling the original motion vector, the encoder may predict a motion vector for each partition, i.e., for each PU. In performing this motion vector prediction, the encoder may select a set of motion vector candidates determined from spatially neighboring blocks in the same frame as the current block or a temporal motion vector candidate determined from a co-located block in a reference frame (i.e., a frame other than the current frame). Video encoder 20 may perform motion vector prediction, and if needed, signal an index to a reference picture to predict the motion vector, rather than signal an original motion vector, to reduce bit rate in signaling. The motion vector candidates from the spatially neighboring blocks may be referred to as spatial MVP candidates, whereas the motion vector candidates from co-located blocks in another reference frame may be referred to as temporal MVP candidates.

Two different modes or types of motion vector prediction are proposed in the HEVC standard. One mode is referred to as a "merge" mode. The other mode is referred to as adaptive motion vector prediction (AMVP).

In merge mode, video encoder 20 instructs video decoder 30, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected motion vector candidate for a current block of the frame. This is accomplished by signaling in the bitstream an index into a motion vector candidate list identifying the selected motion vector candidate (i.e., the particular spatial MVP candidate or temporal MVP candidate).

Thus, for merge mode, the prediction syntax may include a flag identifying the mode (in this case "merge" mode) and an index identifying the selected motion vector candidate. In some instances, the motion vector candidate will be in a causal block in reference to the current block. That is, the motion vector candidate will have already been decoded by video decoder 30. As such, video decoder 30 has already received and/or determined the motion vector, reference index, and motion prediction direction for the causal block. Accordingly, video decoder 30 may simply retrieve the motion vector, reference index, and motion prediction direction associated with the causal block from memory and copy these values as the motion information for the current block. To reconstruct a block in merge mode, video decoder 30 obtains the predictive block using the derived motion information for the current block, and adds the residual data to the predictive block to reconstruct the coded block.

Note, for the skip mode, the same merge candidate list is generated but no residual is signaled. For simplicity, since skip mode has the same motion vector derivation process as merge mode, all techniques described in this document apply to both merge and skip modes.

In AMVP, video encoder 20 instructs video decoder 30, through bitstream signaling, to only copy the motion vector from the candidate block and use the copied vector as a predictor for motion vector of the current block, and signals the motion vector difference (MVD). The reference frame and the prediction direction associated with the motion vector of the current block are signaled separately. An MVD is the difference between the current motion vector for the current block and a motion vector predictor derived from a candidate block. In this case, video encoder 20, using motion estimation, determines an actual motion vector for the block to be coded, and then determines the difference between the actual motion vector and the motion vector predictor as the MVD value. In this way, video decoder 30 does not use an exact copy of the motion vector candidate as the current motion vector, as in the merge mode, but may rather use a motion vector candidate that may be "close" in value to the current motion vector determined from motion estimation and add the MVD to reproduce the current motion vector. To reconstruct a block in AMVP mode, the decoder adds the corresponding residual data to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate block, the MVD between the current motion vector and the predictive motion vector from the candidate block, the reference index, and the motion prediction direction.

Figure 4:
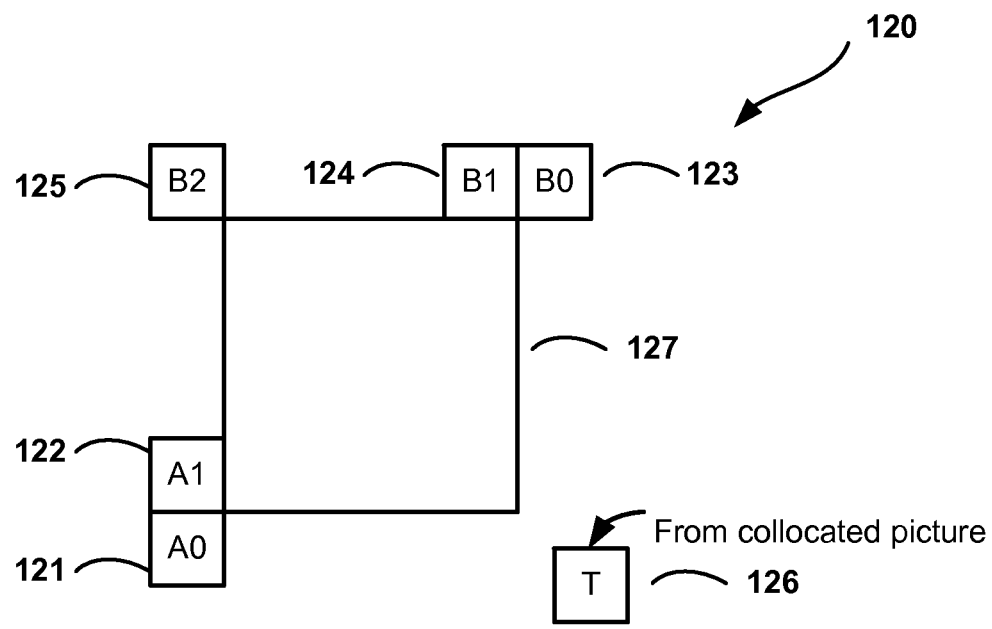
FIG. 4 shows an example set of candidate blocks that may be used in both merge mode and AMVP mode.

FIG. 4 shows an example set of candidate blocks 120 that may be used in both merge mode and AMVP mode. In this example, the candidate blocks are in the below left (A0) 121, left (A1) 122, left above (B2) 125, above (B1) 124, and right above (B0) 123 spatial positions, and in the temporal (T) 126 position(s). In this example, the left candidate block 122 is adjacent the left edge of the current block 127. The lower edge of the left block 122 is aligned with the lower edge of the current block 127. The above block 124 is adjacent the upper edge of the current block 127. The right edge of the above block 124 is aligned with the right edge of the current block 127.

Blocks $A_0$, $A_1$, $B_0$, $B_1$ and $B_2$ are commonly referred to as spatially neighboring blocks or spatially neighboring PUs. Video coder 20/30 may determine the locations of the spatially neighboring blocks by first determining the location of the top-left luma sample of the current PU (e.g. block 127 in FIG. 4) relative to the top-left sample of the current picture. This luma location will be referred to as location (xP, yP). Video coder 20/30 may additionally determine the width of the luma PU (abbreviated nPSW) and the height of the luma PU (abbreviated nPSH). Based on the location of the top-left luma sample of the current PU and the height and width of the current PU, the location of a luma sample of the spatial neighboring blocks can be determined as follows:

block A0 includes the luma sample at location (xP−1, yP+nPSH);

block A1 includes the luma sample at location (xP−1, yP+nPSH−1);

block B0 includes the luma sample at location (xP+nPSW, yP−1);

block B1 includes the luma sample at location (xP+nPSW−1, yP−1);

block B2 includes the luma sample at location (xP−1, yP−1).

The spatial neighboring blocks may either be the same size or may be different sizes than the current PU.

A candidate list for use in merge mode can be derived using the spatial neighboring blocks discussed above. The motion vectors and the reference indices for both reference lists may be derived as specified by the following ordered steps, which are an example of a derivation process for spatial merging candidates. As part of the derivation process, video encoder 20 and video decoder 30 check the motion information of spatial neighboring PUs in the following order: $A_1$, $B_1$, $B_0$, $A_0$, or $B_2$. Video encoder 20 and video decoder 30 may perform constrained pruning in order to reduce or eliminate duplicate candidates from being added to the candidate list. Video coder 20/30 may derive the spatial candidates that are to be included in the merge mode candidate list as follows:

Video coder 20/30 inserts $A_1$ into the candidate list if $A_1$ is available.

If $B_1$ and $A_1$ have the same motion vectors and the same reference indices, then video coder 20/30 does not insert $B_1$ into the candidate list. If $B_1$ and $A_1$ do not have the same motion vectors and the same reference indices, then video coder 20/30 inserts $B_1$ into the candidate list, if $B_1$ is available.

If $B_0$ and $B_1$ have the same motion vectors and the same reference indices, then video coder 20/30 does not insert $B_0$ into the candidate list. If $B_0$ and $B_1$ do not have the same motion vectors and the same reference indices, then video coder 20/30 inserts $B_0$ into the candidate list, if $B_0$ available.

If $A_0$ and $A_1$ have the same motion vectors and the same reference indices, then video coder 20/30 does not insert $A_0$ into the candidate list. If $A_0$ and $A_1$ do not have the same motion vectors and the same reference indices, then video coder 20/30 inserts $A_0$ into the candidate list, if $A_0$ is available.

Video coder 20/30 inserts $B_2$ into the candidate list when both of the following conditions are not satisfied:

$B_2$ and $B_1$ or $B_2$ and $A_1$ have the same motion vectors and the same reference indices.

All of the four spatial merging candidates derived from $A_1$, $B_1$, $B_0$, $A_0$ are included in the candidate list.

Video coder 20/30 may derive the temporal candidate that is to be included in the merge mode candidate list as follows:

To get the temporal merging candidate, video coder 20/30 first identifies a co-located picture. If the current picture is a B slice, a syntax element "collocated_from_l0_flag" is signaled in the slice header to indicate whether the co-located picture is from RefPicList0 or RefPicList1.

After video coder 20/30 identifies a reference picture list, video coder 20/30 uses the syntax element collocated_ref_idx, signaled in slice header, to identify the picture in the picture in the list.

Video coder 20/30 then identifies a co-located PU by checking the co-located picture. Video coder 20/30 uses either the motion of the right-bottom PU of the CU containing this PU, or the motion of the right-bottom PU within the center PUs of the CU containing this PU as the temporal candidate.

When motion vectors identified by the above process are used to generate a motion candidate for merge mode, video coder 20/30 may need to scale the motion vectors based on the temporal location (reflected by picture order count, i.e., POC).

In HEVC, the PPS includes a flag enable_temporal_mvp_flag. When a particular picture with temporal_id equal to 0 refers to a PPS having enable_temporal_mvp_flag equal to 0, video coder 20/30 may mark all the reference pictures in the DPB "unused for temporal motion vector prediction," and no motion vector from pictures before that particular picture in decoding order would be used as a temporal motion vector predictor in decoding of the particular picture or a picture after the particular picture in decoding order.

If the current slice is a B slice and the total number of candidates derived from the spatial and temporal candidate derivation processes described above is less than the maximum number of candidates and greater than 1, then video coder 20/30 may invoke a process for generating bi-predictive candidates. Video coder 20/30 may derive the bi-predictive candidates that are to be included in the merge mode candidate list as follows:

Base on Table 1 below, to generate a combined bi-predictive candidate with index combIdx, the RefList0 motion information (MotList0) of the candidate list with entry equal to l0CandIdx if available and the RefList1 motion information (MotList1) of the candidate list with entry equal to l1CandIdx if available and not identical to MotList0 may be re-used by video coder 20/30 as the RefList0 and RefList1 motion information of the combined bi-predictive candidate.

TABLE 1

Specification of l0CandIdx and l1CandIdx in HEVC

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

Video coder 20/30 may derive the zero motion vector candidates that are to be included in the merge mode candidate list if the total number of candidates derived from the above three processes described above for determining spatial, temporal, and bi-predictive candidates produces less than the maximum number of candidates. In such an instance, video coder 20/30 may insert a zero motion vectors for each reference picture into the candidate list.

In HEVC WD 10, the total number of candidates in the MRG list is up to 5 and five_minus_max_num_merge_cand is signaled to specify the maximum number of the MRG candidates subtracted from 5 in slice header.

To further improve the coding efficiency for coding 3D video, two new technologies namely "inter-view motion prediction" and "inter-view residual prediction" have been introduced into 3D-HEVC. To enable these two coding tools, video coder 20/30 are configured to derive disparity vectors for a current block.

Video coder 20/30 can be configured to derive a disparity vector, using technique referred to as Neighboring Blocks based Disparity Vector (NBDV), which utilizes disparity motion vectors from spatial and temporal neighboring blocks to determine a disparity vector for a current block. In NBDV, video coder 20/30 checks the motion vectors of spatial or temporal neighboring blocks in a fixed checking order, and once a disparity motion vector is identified, i.e., the motion vector points to an inter-view reference picture, video coder 20/30 terminates the checking process. Video coder 20/30 returns the identified disparity motion vector and converts it to the disparity vector which can be used in inter-view motion prediction and inter-view residual prediction. If no disparity motion vector is found after checking all the pre-defined neighboring blocks, video coder 20/30 may use a zero disparity vector for the inter-view motion prediction while inter-view residual prediction can be disabled for the corresponding prediction unit (PU).

The blocks used by video coder 20/30 for NBDV include spatial neighboring blocks and temporal neighboring blocks. Video coder 20/30 analyzes up to five spatial neighboring blocks as part of deriving the disparity vector. The five spatial neighboring blocks include the below-left block, left block, above-right block, above block, and above-left block of the current PU, denoted by $A_0$, $A_1$, $B_0$, $B_1$ or $B_2$. In this regard, the spatial neighboring blocks analyzed as part of NBDV may correspond to the same spatial neighboring blocks discussed above with respect to merge mode in FIG. 4, although the spatial neighboring blocks used for NBDV and candidate list construction for AMVP and merge modes do not necessarily have to be the same.

Video coder 20/30 also determines temporal neighboring blocks. Video coder 20/30 may treat all the reference pictures from current view as candidate pictures, or in some implementations, the number of candidate pictures can be further constrained, for example to four candidate pictures. Video coder 20/30 first checks a co-located reference picture and checks the rest of candidate pictures in, for example, the ascending order of reference index (refIdx). When both RefPicList0[refIdx] and RefPicList1[refIdx] are available, RefPicListX[refIdx] precedes the other picture, wherein X is equal to collocated_from_l0_flag.

For each candidate picture, video coder 20/30 determines three candidate regions for deriving the temporal neighboring blocks. When a region covers more than one 16×16 block, video coder 20/30 can check all 16×16 blocks in such a region in, for example, raster scan order. The three candidate regions are defined as follows: (1) CPU The co-located region of the current PU or current CU, (2)
CLCU The largest coding unit (LCU) covering the co-located region of the current PU, and (3) BR—Bottom-right 4×4 block of CPU.

Video coder 20/30 may be configured to check the blocks in a specific order, i.e. a checking order. Video coder 20/30 may first check the spatial neighboring blocks, followed by temporal neighboring blocks. The checking order of the five spatial neighboring blocks may, for example, be defined as $A_1$, $B_1$, $B_0$, $A_0$ and $B_2$, or any other such order. For each candidate picture, video coder 20/30 can check the three candidate regions in the candidate picture in a checking order. The checking order of the three regions may, for example, defined as CPU, CLCU, and BR for the first non-base view, BR, CPU, and CLU for the second non-base view, or any other such order.

As introduced above, video coder 20/30 may be configured to perform inter-view candidate derivation. Based on the disparity vector (DV), video coder 20/30 can determine a new motion vector candidate or inter-view predicted motion vector, if available, and the new motion vector candidate or inter-view predicted motion vector to a candidate list for use in AMVP and skip/merge modes. The inter-view predicted motion vector, if available, is a temporal motion vector.

Figure 5:
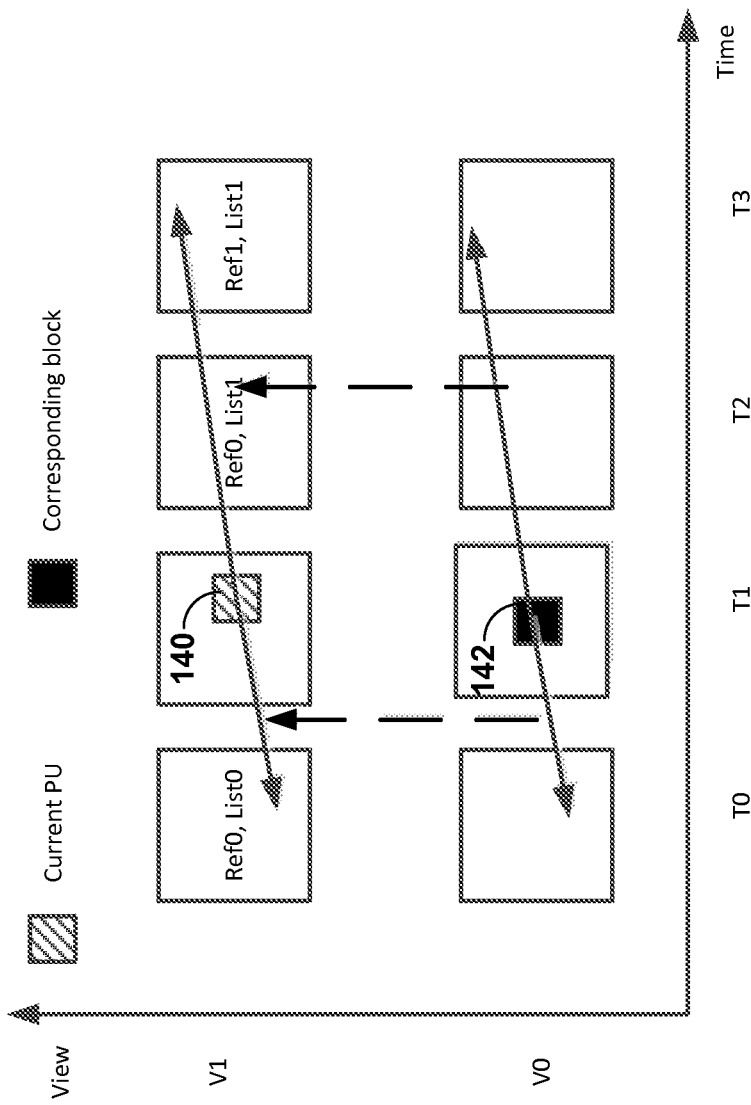
FIG. 5 is a conceptual diagram illustrating an example derivation process of an inter-view predicted motion vector candidate.

FIG. 5 shows an example of the derivation process of the inter-view predicted motion vector candidate. A disparity vector is calculated by finding corresponding block 142 in a different view (e.g., view 0 or V0) to current PU 140 in the currently coded view (view 1 or V1). If corresponding block 142 is not intra-coded and not inter-view predicted, and its reference picture has a POC value that is in the reference picture list of current PU 140 (e.g., Ref0, List 0; Ref0, List1; Ref1, List 1, as shown in FIG. 5), then the motion information for corresponding block 142 is used as an inter-view predicted motion vector. As stated above, the reference index may be scaled based on the POC.

If the inter-view predicted motion vector is not available, i.e., both prediction utilization flags of all available reference picture lists are equal to 0, the disparity vector is converted to an inter-view disparity motion vector, which is added into the AMVP or merge candidate list, in the same position, as inter-view predicted motion vector when it is available.

During either skip/merge or AMVP mode, there might be up to two inter-view predicted motion vectors, corresponding to RefPicList0 and RefPicList1 respectively. These two motion vectors are denoted as inter-view predicted motion vector 0 and inter-view predicted motion vector 1, respectively.

For one example merge/skip mode technique, video coder 20/30 may derive the inter-view predicted motion vector as follows:

Video coder 20/30 locates, by the disparity vector, a corresponding block of current PU/CU in a reference view of the same access unit.

If the corresponding block is not intra-coded, for each reference picture list (i.e. RefPicListX, with X being 0 or 1) of current PU/CU, then video coder 20/30 may:

If the corresponding block has a motion vector (mvLX) referring to a temporal reference picture and the temporal reference picture has a POC value equal to that of one entry in RefPicListX, then video coder 20/30 may set mvLX to inter-view predicted motion vector X and set the target reference index to the first picture in RefPicListX, which has the same POC as the reference picture mvLX refers to. Video coder 20/30 may additionally set the prediction utilization flag of RefPicListX, denoted by predFlagLXInterView, to 1, indicating that the predictor for mvLX is currently available. Otherwise video coder 20/30 sets predFlagLXInterView to 0, indicating the predictor for mvLX is currently unavailable. If a predictor for mvLX is unavailable, the AMVP candidate based on mvLX is not generated. If a predictor for mvLX and mvLY (with Y being equal to 1-X) are both unavailable, the merge candidate based on them is not generated. If only one of the predictors for mvLX is available, a merge candidate based on the available candidate can be generated as a uni-directional prediction candidate.

In the above-described technique, when the reference picture of the corresponding block in one reference picture list X (with X being 0 or 1) is a temporal reference picture and its POC value is unequal to that of any entry in RefPicListLX but equal to that of one entry in RefPicListLY of current PU/CU, the corresponding motion vector is also considered as unavailable for RefPicListLY, including when the prediction utilization flag of RefPicListLY is equal to 0. According to techniques of this disclosure, however, for the skip/merge mode, if the corresponding block (located by a disparity vector) has a motion vector mvLX (with X being 0 or 1) referring to a temporal reference picture, video coder 20/30 may be configured to use mvLX to predict not only the inter-view predicted motion vector X but also the inter-view predicted motion vector Y (with Y being equal to 1-X).

Accordingly, if mvLX refers to a reference picture which has the same POC value as any picture in RefPicListX of the current slice, then video coder 20/30 may set mvLX to inter-view predicted motion vector X and set the target reference index to the first picture in RefPicListX which has the same POC as the reference picture mvLX refers to. Otherwise, if mvLY refers to a reference picture which has the same POC value as any picture in RefPicListX in the current slice, then video coder 20/30 may set mvLY to inter-view predicted motion vector X and set the target reference index to the first picture in RefPicListX which has the same POC as the reference picture mvLY refers to. More detailed examples of how video coder 20/30 may use mvLX to predict not only the inter-view predicted motion vector X but also the inter-view predicted motion vector Y will be provided below.

For one example AMVP mode technique, if the target reference index corresponds to a temporal motion vector, video coder 20/30 may derive the inter-view prediction motion vector as follows:

Video coder 20/30 locates, by the disparity vector, a corresponding block of current PU/CU in a reference view of the same access unit.

Given a target reference picture list (RefPicListLX, with X being replaced by 0 or 1) and a target reference picture index Idx, then video coder 20/30 derives inter-view predicted motion vector X as follows:

a. Video coder 20/30 sets the available flag (availableFlagLXInterView) of the inter-view predicted motion vector for RefPicListLX to 0.

b. If the corresponding block has a motion vector mvL0 referring to a temporal reference picture and the reference picture has a POC value equal to that of RefPicListLX[Idx] of current PU/CU, video coder 20/30 derives the motion vector to be the inter-view predicted motion vector for RefPicListLX and sets availableFlagLXInterView to 1.

c. If availableFlagLXInterView is equal to 0 and the reference picture that mvL1 of the corresponding block points to is available and not an inter-view reference picture and it has a POC value equal to that of RefPicListLX[Idx] of current PU/CU, then video coder 20/30 derives the motion vector to be the inter-view predicted motion vector for RefPicListLX and sets availableFlagLXInterView to 1.

In AMVP mode, if the target reference index corresponds to a disparity motion vector, the inter-view predicted motion vector may not be derived and the disparity vector is converted to an inter-view disparity motion vector.

In the example AMVP mode technique described above, the motion information of reference picture list 0 of the corresponding block is always checked first no matter if the target reference picture list is 0 or 1. According to techniques of this disclosure, however, in the AMVP mode, for a given target reference index refIdxLX, instead of first comparing the POC value of the picture referred by mvL0 and then that referred by the mvL1 of the corresponding block, with the POC of RefPicListX[refIdxLX] (of the current slice), video coder 20/30 may first compare the POC value of the picture referred by mvLX and then that referred by mvLY (with Y equal to 1−X). Once the inter-view predicted motion vector is found, video coder 20/30 may terminate comparison process. When the comparison concludes that the POC value of RefPicListX[refIdxLX] is equal to the POC value of the picture referred by mvL0 or mvL1 during the comparison, the inter-view predicted motion vector is available and may be set, but video coder 20/30, to mvL0 or myL1.

For both the example merge/skip mode technique and the example AMVP mode technique discussed above, when the POC of the reference picture of the corresponding block is different from that of any entry of the reference picture list of current CU/PU, the inter-view predicted motion vector is considered as unavailable. According to techniques of this disclosure, however, when neither mvL0 nor mvL1 refers to a temporal reference picture which has the same POC as that of any reference picture in RefPicList0 or RefPicList1 of the current slice, video coder 20/30 may derive the inter-view predicted motion vector 0 by scaling the first available mvL0 and mvL1 to the first temporal reference picture in RefPicList0 based on POC distances.

Thus far, this disclosure has discussed several shortcomings of known 3D-HEVC AMVP and merge mode techniques and introduced techniques that may address some of these shortcomings. The techniques introduced in this disclosure may further improving the coding efficiency of inter-view predicted motion vector in HEVC-based multiview or 3DV coding. More detailed examples of the techniques introduced above will now be provided.

As introduced above, video coder 20/30 may be configured to perform an inter-view predicted motion vector derivation process for merge/skip mode. An example of how such a derivation process may be performed according to the techniques of this disclosure will now be discussed. For the merge/skip mode, video coder 20/30 can derive the inter-view predicted motion vector X (with X being equal to 0 or 1) as follows:

Video coder 20/30 can locate, by the disparity vector, a corresponding block of current PU/CU in a reference view of the same access unit. The two motion vectors of the corresponding block, if available, can be denoted as mvLX and mvLY (with Y equal to 1−X) and the corresponding reference pictures can be denoted as corRefPicX and corRefPicY.

Video coder 20/30 can initially set predFlagLXInterView to 0, indicating that RefPicListLX is not used for prediction with mvLX.

If corRefPicX is available and it is a temporal reference picture, then video coder 20/30 can perform the following:

For each i from 0 to num_ref_idx_1X_active_minus1, inclusive, if the POC of RefPicListX[i] (of the current slice) is equal to the POC of the corRefPicX, then video coder 20/30 can set the inter-view predicted motion vector X equal to mvLX, set the target reference index to i, and set the predFlagLXInterView to 1. In other words, a set of the reference pictures in RefPicListX are analyzed to determine if they have a POC equal to the POC of corRefPicX. If a reference picture in RefPicListX, does have a POC equal to the POC of corRefPicX, then the target reference is set is to identify that reference picture. Additionally, video coder 20/30 sets predFlagLXInterView to 1 to indicate that RefPicListLX is used for prediction with mvLX. The set of pictures in RefPicListLX includes pictures with indexes from 0 to num_ref_idx_1X_active_minus1.

If predFlagLXInterView is equal to 0, meaning in the above step video coder 20/30 did not find a reference picture in RefPicListX that has a POC equal to the POC of corRefPicX, and if corRefPicY is available and is a temporal reference picture, then video coder 20/30 can perform the following:

For each i from 0 to num_ref_idx_1X_active_minus1, inclusive, if the POC of RefPicListX[i] is equal to the POC of the corRefPicY, then video coder 20/30 sets the inter-view predicted motion vector X equal to mvLY, sets the target reference index to i, and sets predFlagLXInterView to 1. In other words, a set of the reference pictures in RefPicListX are analyzed to determine if they have a POC equal to the POC of corRefPicY. If a reference picture in RefPicListX does have a POC equal to the POC of corRefPicY, then the target reference is set is to identify that reference picture. Additionally, video coder 20/30 sets predFlagLXInterView to 1 to indicate that RefPicListLX is used for prediction with mvLY. The set of pictures in RefPicListLX includes pictures with indexes from 0 to num_ref_idx_1X_active_minus1.

In one implementation, when both of inter-view predicted motion vector 0 and inter-view predicted motion vector 1 are available and refer to the same reference picture, and have the same motion vectors (both horizontal and vertical components), then video coder 20/30 sets one of the two inter-view predicted motion vectors to unavailable. In one alternative, video coder 20/30 sets the inter-view predicted motion vector 1 as unavailable, while in another alternative, video coder 20/30 sets the inter-view predicted vector 0 as unavailable.

In another implementation according to the techniques of this disclosure, for the merge/skip mode, video coder 20/30 may derive the inter-view predicted motion vector as follows:

Video coder 20/30 locates, by the disparity vector, a corresponding block of a current PU/CU in a reference view of the same access unit. The two motion vectors of the corresponding block, if available, can be denoted as mvLX and mvLY (with Y equal to 1−X) and the corresponding reference pictures can be denoted as corRefPicX and corRefPicY.

For each X from 0 to 1, the following apply:
Video coder 20/30 can set predFlagLXInterView to 0.
If corRefPicX is available and is a temporal reference picture, the following applies until predFlagLXInterView is equal to 1:
For each i from 0 to num_ref_idx_1X_active_minus1, inclusive, if the POC of RefPicListX[i] (of the current slice) is equal to the POC of the corRefPicX, inter-view predicted motion vector X is set equal to mvLX, and the target reference index is set to i, predFlagLXInterView is set to 1.

If both inter-view predicted motion vector X and inter-view predicted motion vector Y are unavailable, i.e., predFlagL0InterView and predFlagL1InterView are equal to 1, for each X from 0 to 1, the following apply:
If corRefPicY (with Y being equal to 1−X) is available and it is a temporal reference picture, the following applies until predFlagLXInterView is equal to 1:
For each i from 0 to num_ref_idx_1X_active_minus1, inclusive, if the POC of RefPicListX[i] is equal to the POC of the corRefPicY, inter-view predicted motion vector X is set equal to mvLY, and the target reference index is set to i, predFlagLXInterView is set to 1.

As introduced above, video coder 20/30 may be configured to perform inter-view predicted motion vector derivation with scaling, an example of which will now be discussed. When both of inter-view predicted motion vector 0 and inter-view predicted motion vector 1 are unavailable when derived by the techniques described above, video coder 20 may derive inter-view predicted motion vector 0 as follows:

Video coder 20/30 can locate a corresponding block, by the disparity vector, of current PU/CU in a reference view of the same access unit. The two motion vectors of the corresponding block, if available, can be denoted as mvLX and mvLY (with Y equal to 1−X), and the corresponding reference pictures can be denoted as corRefPicX and corRefPicY.

Video coder 20/30 can set predFlagL0InterView to 0.

For each X from 0 to 1, video coder 20/30 may perform the following until predFlagL0InterView is set equal to 1.
If mvLX is available and corRefPicX is a temporal reference picture, then video coder 20/30:
For each i from 0 to num_ref_idx_10_active_minus1, inclusive, if RefPicList0[i] is a temporal reference picture, video coder 20/30 derives inter-view predicted motion vector 0 as a scaled version of the motion vector as specified by equations 1-5 below:

$$tx=(16384+(\text{Abs}(td)>>1))/td \quad (1)$$

$$\text{distScaleFactor}=\text{Clip3}(-4096,4095,(tb*tx+32)>>6) \quad (2)$$

$$\text{inter-view predicted motion vector } 0=\text{Clip3}(-32768, 32767,\text{Sign2}(\text{distScaleFactor}*mvLX)*((\text{Abs}(\text{distScaleFactor}*mvLX)+127)>>8)) \quad (3)$$

where PicOrderCntVal is the POC of current picture, td and tb are derived as $$td=\text{Clip3}(-128,127,\text{PicOrderCntVal}-\text{PicOrderCnt}(\text{corRefPicX})) \quad (4)$$

$$tb=\text{Clip3}(-128,127,\text{PicOrderCntVal}-\text{PicOrderCnt}(\text{RefPicListX}[i])) \quad (5)$$

and the target reference index for inter-view predicted motion vector 0 is set to i, and predFlagL0InterView is set to 1.

In one implementation, after applying the techniques above method, if an inter-view predicted motion vector is still not available, then video coder 20/20 may perform the following:

For each X from 0 to 1, the following apply until predFlagL1InterView is equal to 1.
If mvLX is available and corRefPicX is a temporal reference picture, the following applies:
For each i from 0 to num_ref_idx_11_active_minus1, inclusive, if RefPicList1 [i] is a temporal reference picture, video coder 20/30 may derive the inter-view predicted motion vector 1 as a scaled version of the motion vector as specified by equations 6-10 below:

$$tx=(16384+(\text{Abs}(td)>>1))/td \quad (6)$$

$$\text{distScaleFactor}=\text{Clip3}(-4096,4095,(tb*tx+32)>>6) \quad (7)$$

$$\text{inter-view predicted motion vector } 1=\text{Clip3}(-32768, 32767,\text{Sign2}(\text{distScaleFactor}*mvLX)*((\text{Abs}(\text{distScaleFactor}*mvLX)+127)>>8)) \quad (8)$$

where PicOrderCntVal is the POC of current picture, td and tb are derived as $$td=\text{Clip3}(-128,127,\text{PicOrderCntVal}-\text{PicOrderCnt}(\text{corRefPicX})) \quad (9)$$

$$tb=\text{Clip3}(-128,127,\text{PicOrderCntVal}-\text{PicOrderCnt}(\text{RefPicListX})) \quad (10)$$

When either of inter-view predicted motion vector 0 and inter-view predicted motion vector 1 are unavailable to be derived by the techniques described above or any other methods, video coder 20/30 may derive inter-view predicted motion vector X (with X being replaced by 0 or 1) for skip/merge mode as follows:

Video coder 20/30 locates, using a disparity vector, a corresponding block of current PU/CU in a reference view of the same access unit. The two motion vectors of the corresponding block, if available, may be denoted as mvLX and mvLY (with Y equal to 1−X), and the corresponding reference pictures may be denoted as corRefPicX and corRefPicY.

Video coder 20/30 can set predFlagLXInterView to 0.
If mvLX is available and corRefPicX is a temporal reference picture, then video coder 20/30 may:
For each i from 0 to num_ref_idx_1X_active_minus1, inclusive, if RefPicListX[i] is a temporal reference picture, video coder 20/30 may derive inter-view predicted motion vector X as a scaled version of the motion vector as specified by equations 11-15 below:

$$tx=(16384+(\text{Abs}(td)>>1))/td \quad (11)$$

$$\text{distScaleFactor}=\text{Clip3}(-4096,4095,(tb*tx+32)>>6) \quad (12)$$

$$\text{inter-view predicted motion vector } X=\text{Clip3}(-32768, 32767,\text{Sign2}(\text{distScaleFactor}*mvLX)*((\text{Abs}(\text{distScaleFactor}*mvLX)+127)>>8)) \quad (13)$$

where PicOrderCntVal is the POC of current picture, td and tb are derived as $$td=\text{Clip3}(-128,127,\text{PicOrderCntVal}-\text{PicOrderCnt}(\text{corRefPicX})) \quad (14)$$

$$tb=\text{Clip3}(-128,127,\text{PicOrderCntVal}-\text{PicOrderCnt}(\text{RefPicListX})) \quad (15)$$

and the target reference index is set to i, predFlagLXInterView is set to 1.

In one implementation for the merge mode, video coder 20/30 may derive a target reference index refIdxLX in any other means, including via signaling, e.g., in slice header when predFlagL0InterView and/or predFlagL1InterView are not available. In this case the target reference index is known, and video coder 20/30 may directly perform the scaling, thus eliminating a need for further searching for the target reference index. According to such a technique, video coder 20/30 may determine an inter-view predicted motion vector as follows:

Video coder 20/30 locates a corresponding block of current PU/CU, using a disparity vector, in a reference view of the same access unit. The two motion vectors of the corresponding block, if available, can be denoted as mvLX and mvLY (with Y equal to 1−X), and the corresponding reference pictures can be denoted as corRefPicX and corRefPicY.

Video coder 20/30 sets predFlagLXInterView to 0.

If mvLX is available and corRefPicX is a temporal reference picture, then video coder 20/30 may:
  if RefPicListX[refIdxLX] is a temporal reference picture, video coder 20/30 may derive the inter-view predicted motion vector as scaled version of the motion vector as specified by equations 16-20 below:

$$tx=(16384+(Abs(td)>>1))/td \quad (16)$$

$$distScaleFactor=Clip3(-4096,4095,(tb*tx+32)>>6) \quad (17)$$

$$\text{inter-view predicted motion vector } X=Clip3(-32768, 32767,Sign2(distScaleFactor*mvLX)*((Abs(distScaleFactor*mvLX)+127)>>8)) \quad (18)$$

where PicOrderCntVal is the POC of current picture, td and tb are derived as $$td=Clip3(-128,127,PicOrderCntVal-PicOrderCnt(corRefPicX)) \quad (19)$$

$$tb=Clip3(-128,127,PicOrderCntVal-PicOrderCnt(RefPicListX[refIDxLX])) \quad (20)$$

and predFlagLXInterView is set to 1.

In another implementation, video coder 20/30 may potentially scaling mvLY to derive the inter-view predicted motion vector X if it is not available yet. According to such a technique, if mvLY is available and corRefPicY is a temporal reference picture, and if RefPicListX[refIdxLX] is a temporal reference picture, then video coder 20/30 may derive an inter-view predicted motion vector as a scaled version of the motion vector as specified by equations 21-25 below:

$$tx=(16384+(Abs(td)>>1))/td \quad (21)$$

$$distScaleFactor=Clip3(-4096,4095,(tb*tx+32)>>6) \quad (22)$$

$$\text{inter-view predicted motion vector } X=Clip3(-32768, 32767,Sign2(distScaleFactor*mvLY)*((Abs(distScaleFactor*mvLY)+127)>>8)) \quad (23)$$

where PicOrderCntVal is the POC of current picture, td and tb are derived as $$td=Clip3(-128,127,PicOrderCntVal-PicOrderCnt(corRefPicY)) \quad (24)$$

$$tb=Clip3(-128,127,PicOrderCntVal-PicOrderCnt(RefPicListX[refIdxLY])) \quad (25)$$

and predFlagLXInterView is set to 1.

As introduced above, video coder 20/30 may perform an inter-view predicted motion vector derivation process for AMVP mode. In AMVP mode, if the target reference index corresponds to a temporal motion vector, video coder 20/30 may derive the inter-view predicted motion vector X as follows:
  The given target reference picture index for current PU/CU is denoted by refIdxLX. Video coder 20/30 locates a corresponding block of current PU/CU, using a disparity vector, in a reference view of the same access unit. The two motion vectors of the corresponding block, if available, are denoted as mvLX and mvLY (with Y equal to 1−X) and the corresponding reference pictures are denoted as corRefPicX and corRefPicY.

Video coder 20/30 sets predFlagLXInterView to 0.

If corRefPicX is available and it is a temporal reference picture, then video coder 20/30 may perform the following:
  If the POC of RefPicListX[refIdxLX] (of the current slice) is equal to the POC of the corRefPicX, video coder 20/30 sets the inter-view predicted motion vector X equal to mvLX and sets predFlagLXInterView to 1.

Otherwise, video coder 20/30 sets predFlagLXInterView equal to 0, and if corRefPicY is available and is a temporal reference picture, video coder 20/30 performs the following:
  If the POC of RefPicListX[refIdxLX] is equal to the POC of the corRefPicY, video coder 20/30 sets the inter-view predicted motion vector X equal to mvLY and sets predFlagLXInterView equal to 1.

Alternatively, in addition, if predFlagLXInterView is still equal to 0 and RefPicListX[refIdxLX] is a temporal reference frame, video coder 20/30 may perform the following:
  If corRefPicX is available and is a temporal reference picture, video coder 20/30 may derive the inter-view predicted motion vector by scaling mvLX, based on POC distance and set predFlagLXInterView to 1.
  If predFlagLXInterView is 0 and corRefPicY is available and is a temporal reference picture, video coder 20/30 may derive the inter-view predicted motion vector by scaling mvLY, based on POC distance and set predFlagLXInterView equal to 1.

Figure 6:
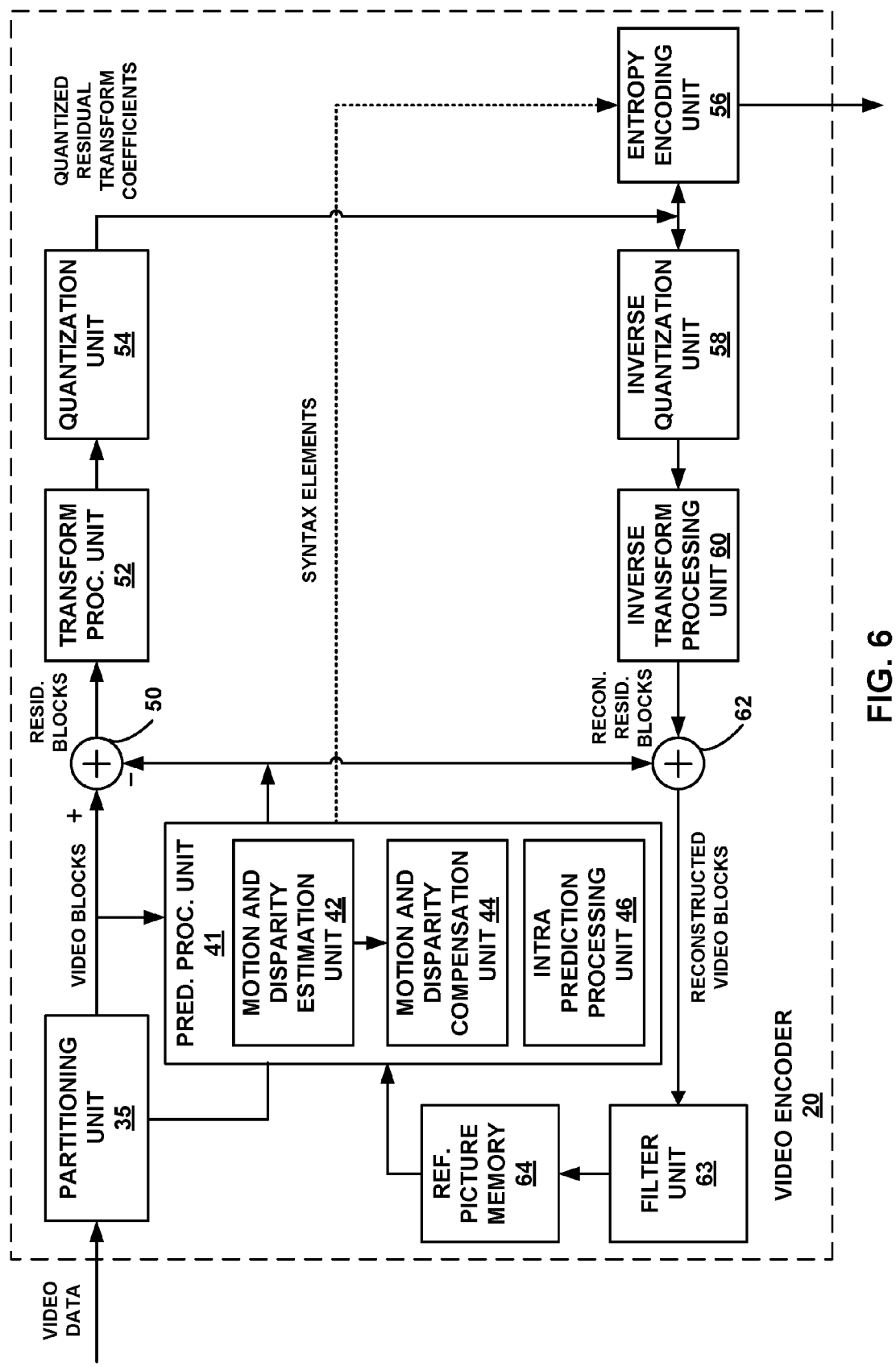
FIG. 6 is a block diagram illustrating an example of a video encoder that may implement the inter-prediction techniques of this disclosure.

FIG. 6 is a block diagram illustrating an example video encoder 20 that may implement the techniques described in this disclosure, including the inter-view prediction techniques described above. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a partitioning unit 35, prediction processing unit 41, filter unit 63, reference picture memory 64, summer 50, transform unit 52, quantization unit 54, and entropy encoding unit 56. Prediction processing unit 41 includes motion and disparity estimation unit 42, motion and disparity compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter.

As shown in FIG. 6, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures and/or reference views to provide temporal or view compression.

Motion and disparity estimation unit 42 may be configured to determine the inter-prediction mode and/or interview prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 42 sends the calculated motion vector and/or disparity vector to entropy encoding unit 56 and motion and disparity compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion and disparity compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

Figure 7:
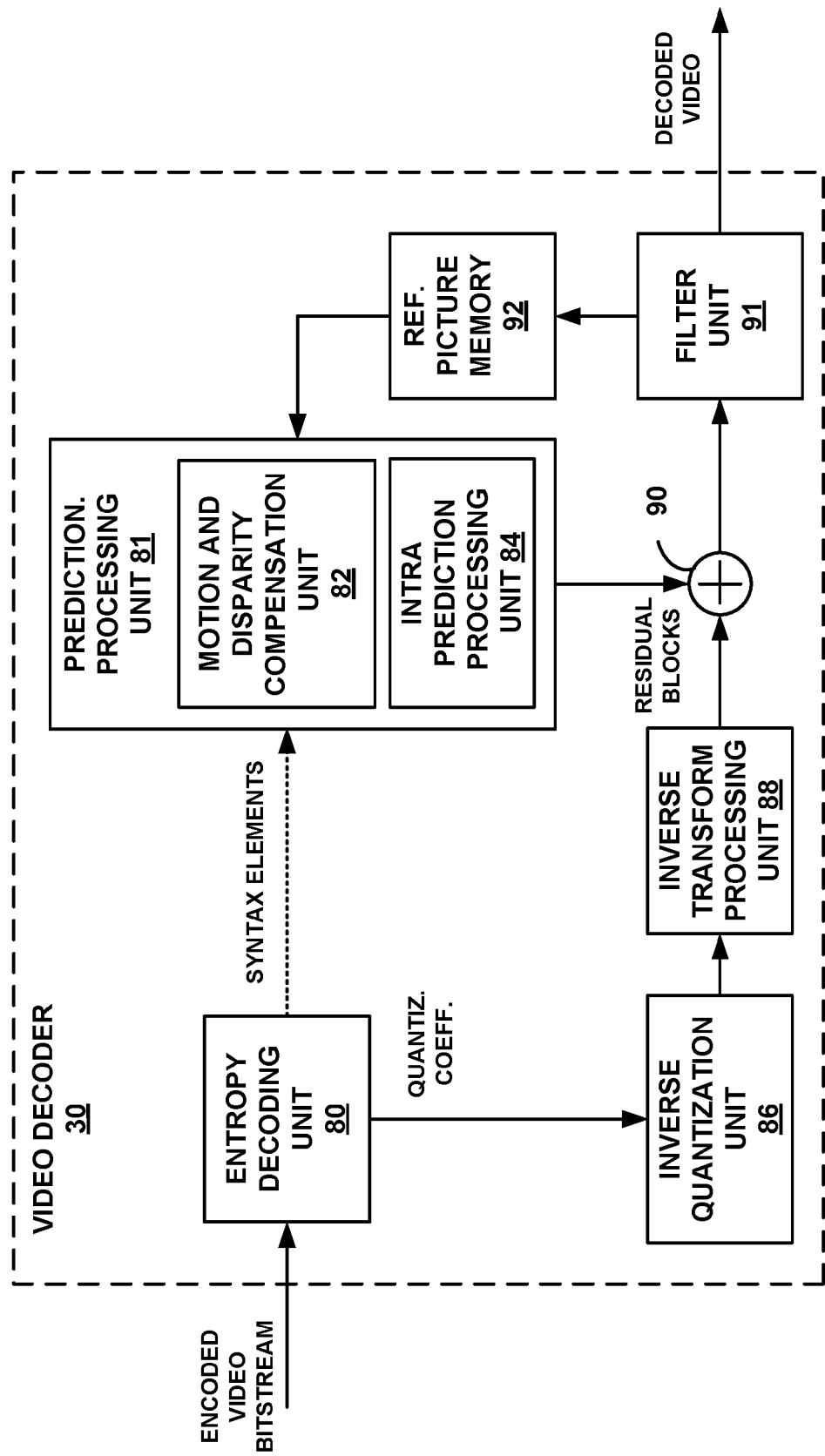
FIG. 7 is a block diagram illustrating an example of a video decoder that may implement the inter-prediction techniques of this disclosure.

FIG. 7 is a block diagram illustrating an example video decoder 30 that may implement the techniques described in this disclosure, including the inter-view prediction techniques described above. In the example of FIG. 7, video decoder 30 includes an entropy decoding unit 80, prediction processing unit 81, inverse quantization unit 86, inverse transform processing unit 88, summer 90, filter unit 91, and reference picture memory 92. Prediction processing unit 81 includes motion and disparity compensation unit 82 and intra prediction processing unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion and disparity compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or inter-view prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode. Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 8:
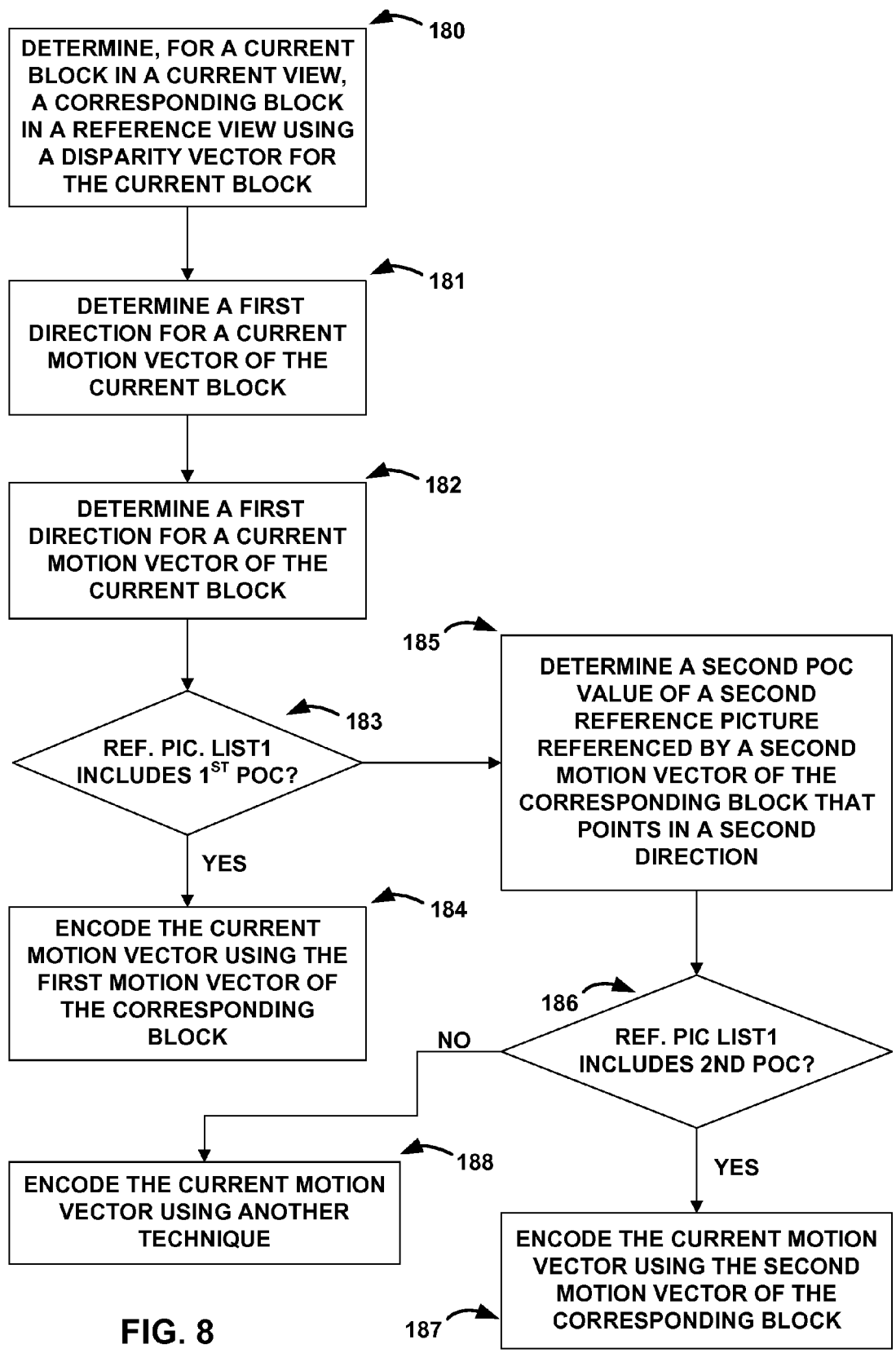
FIG. 8 is a flowchart showing an example encoding process according to the techniques of the disclosure.

FIG. 8 is a flowchart showing an example encoding process according to the techniques of the disclosure. The techniques of FIG. 8 will be described with respect to video encoder 20 but may be performed by other types of video encoders. Video encoder 20 determines, for a current block in a current view, a corresponding block in a reference view using a disparity vector for the current block (180). The disparity vector may, for example, be determined by video encoder 20 using one or more of the NBDV techniques described above. Video encoder 20 determines a first direction for a current motion vector of the current block (181). Video encoder 20 determines a first POC value of a first reference picture referenced by a first motion vector of the corresponding block that points in the first direction (182). Video encoder 20 determines whether a first reference picture list for the current block includes a reference picture having the first POC value (183). The first reference picture list corresponds to the first direction. In response to the first reference picture list including the reference picture having the first POC value (183, yes), video encoder 20 encodes the current motion vector using the first motion vector of the corresponding block (184). Video encoder 20 may, for example, encode the current motion vector by adding the first motion vector to an AMVP or merge mode candidate list as described above. In response to the first reference picture list not including the reference picture having the first POC value (183, no), video encoder 20 determines a second POC value of a second reference picture referenced by a second motion vector of the corresponding block that points in a second direction (185). The second direction is different than the first direction. Video encoder 20 determines whether the first reference picture list for the current block includes a reference picture having the second POC value (186). In response to the first reference picture list including the reference picture having the second POC value (186, yes), video encoder 20 encodes the current motion vector using the second motion vector of the corresponding block (187). Video encoder 20 may, for example, encode the current motion vector by adding the second motion vector to an AMVP or merge mode candidate list as described above. In response to the first reference picture list not including the reference picture having the second POC value (186, no), video encoder 20 encodes the current motion vector using another technique (187). Examples of techniques include, for example, using a scaled version of the first or second motion vector, using a zero vector, or other such techniques.

Figure 9:
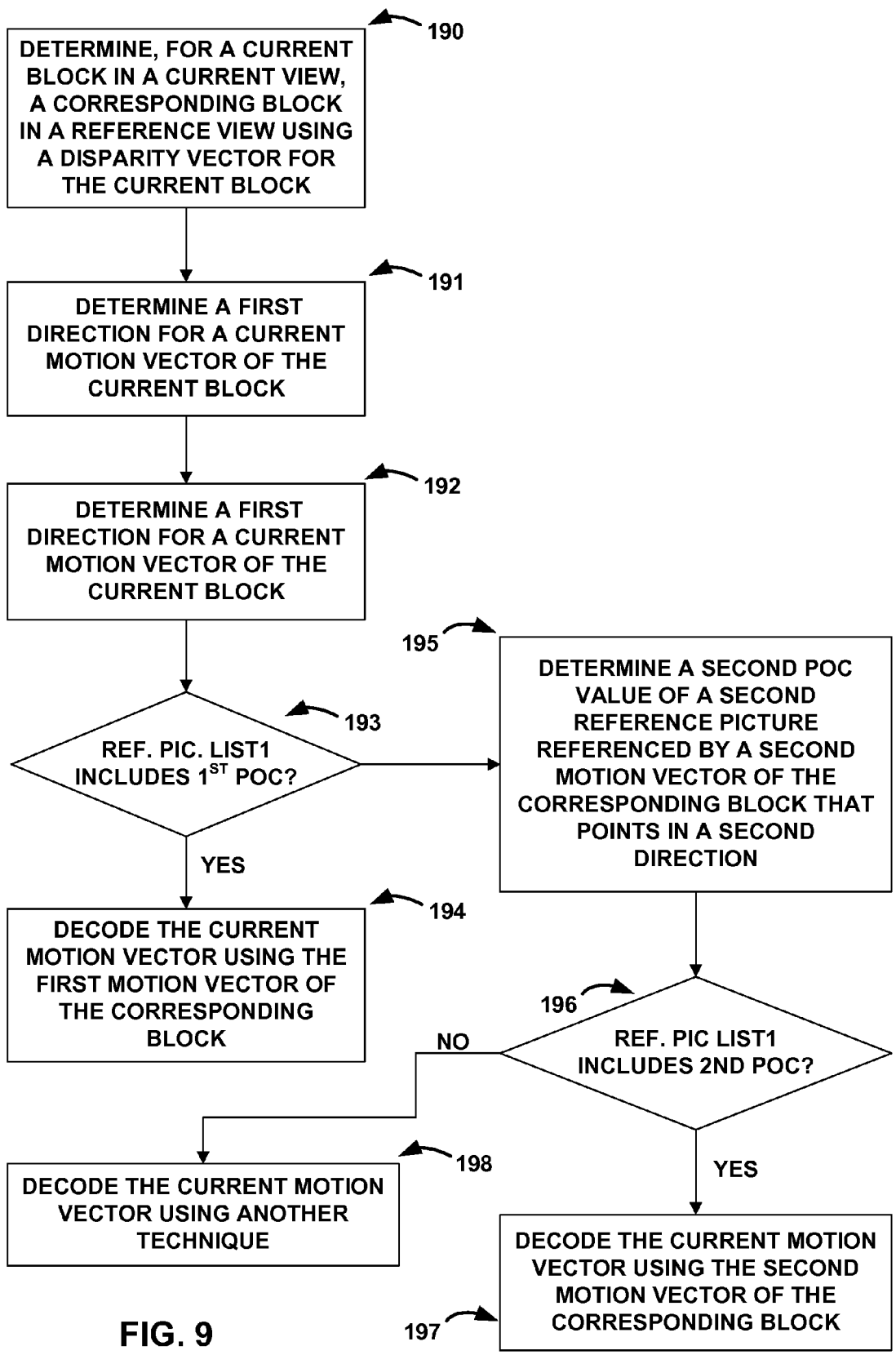
FIG. 9 is a flowchart showing an example decoding process according to the techniques of the disclosure.

FIG. 9 is a flowchart showing an example decoding process according to the techniques of the disclosure. The techniques of FIG. 9 will be described with respect to video decoder 30 but may be performed by other types of video decoder. Video decoder 30 determines, for a current block in a current view, a corresponding block in a reference view using a disparity vector for the current block (190). The disparity vector may, for example, be determined by video decoder 30 using one or more of the NBDV techniques described above. Video decoder 30 determines a first direction for a current motion vector of the current block (191). Video decoder determines a first POC value of a first reference picture referenced by a first motion vector of the corresponding block that points in the first direction (192). Video decoder 30 determines whether a first reference picture list for the current block includes a reference picture having the first POC value (193). The first reference picture list corresponds to the first direction. In response to the first reference picture list including the reference picture having the first POC value (193, yes), video decoder 30 decodes the current motion vector using the first motion vector of the corresponding block (194). Video decoder 30 may, for example, decode the current motion vector by adding the first motion vector to an AMVP or merge mode candidate list as described above.

In response to the first reference picture list not including the reference picture having the first POC value (193, no), video decoder 30 determines a second POC value of a second reference picture referenced by a second motion vector of the corresponding block that points in a second direction (195). The second direction is different than the first direction. Video decoder 30 determines whether the first reference picture list for the current block includes a reference picture having the second POC value (196). In response to the first reference picture list including the reference picture having the second POC value (196, yes), video decoder 30 decodes the current motion vector using the second motion vector of the corresponding block (197). Video decoder 30 may, for example, decode the current motion vector by adding the second motion vector to an AMVP or merge mode candidate list as described above. In response to the first reference picture list not including the reference picture having the second POC value (196, no), video decoder 30 decodes the current motion vector using another technique (197). Examples of techniques include, for example, using a scaled version of the first or second motion vector, using a zero vector, or other such techniques.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding multiview video data, the method comprising:
    determining, for a current block in a current view, a corresponding block in a reference view using a disparity vector for the current block;
    determining a first motion prediction direction for a current motion vector of the current block;
    determining a first picture order count (POC) value of a first reference picture referenced by a reference index associated with a first motion vector of the corresponding block that points in the first motion prediction direction;
    determining whether a first reference picture list for the current block includes a reference picture having the first POC value, wherein the first reference picture list for the current block corresponds to the first motion prediction direction;
    in response to the first reference picture list for the current block including the reference picture having the first POC value, decoding the current motion vector using the first motion vector of the corresponding block as a directional motion predictor;
    in response to the first reference picture list for the current block not including the reference picture having the first POC value:
        determining a second POC value of a second reference picture referenced by a reference index associated with a second motion vector of the corresponding block that points in a second motion prediction direction, wherein the second motion prediction direction is different than the first motion prediction direction;
        determining whether the first reference picture list for the current block includes a reference picture having the second POC value; and
    in response to the first reference picture list for the current block including the reference picture having the second POC value, decoding the current motion vector using the second motion vector of the corresponding block as the directional motion predictor.

2. The method of claim 1, comprising:
    adding a merge candidate to a merge candidate list, wherein when the first reference picture list for the current block includes the reference picture having the first POC value, the merge candidate comprises a reference picture index corresponding to the reference picture having the first POC value and comprises the first motion vector, and when the first reference picture list for the current block does not include the reference picture having the first POC value, the merge candidate comprises a reference picture index corresponding to the reference picture having the second POC value and comprises the second motion vector;
    decoding an index value, wherein the index value corresponds to the merge candidate; and
    predicting the current block using the merge candidate corresponding to the index value.

3. The method of claim 2, further comprising:
    decoding the current motion vector using a motion vector predictor candidate, wherein the motion vector predictor candidate comprises the directional motion predictor and a second directional motion predictor.

4. The method of claim 1, wherein when the first reference picture list for the current block does not include the reference picture having the first POC value and when a second reference picture list for the current block does not include the reference picture having the second POC value, the method further comprises:
    determining whether a first POC difference, representing the difference between the first POC value and a first closest POC value for a reference picture in the first reference picture list for the current block to the first POC value, is greater than a second POC difference, representing the difference between the second POC value and a second closest POC value for a reference picture in the second reference picture list for the current block to the second POC value;
    when the first POC difference is greater than the second POC difference, scaling the first motion vector according to the first POC difference and decoding the current motion vector using the scaled first motion vector; and
    when the first POC difference is not greater than the second POC difference, scaling the second motion vector according to the second POC difference and decoding the current motion vector using the scaled second motion vector.

5. The method of claim 1, further comprising:
    including a motion vector predictor candidate as a merge candidate in a merge candidate list for the current block, wherein the motion vector predictor candidate comprises the directional motion predictor and a second directional motion predictor;
    decoding an index value, wherein the index value corresponds to the directional motion predictor; and
    predicting the current block using the merge candidate corresponding to the index value.

6. The method of claim 1, wherein decoding the current motion vector using the motion predictor comprises further comprising:
- including the a motion vector of the directional motion predictor in a list of candidate motion vectors for an advanced motion vector prediction (AMVP) mode for the current block;
- decoding an index value, wherein the index value corresponds to a motion vector from the list of candidate motion vectors;
- decoding a motion vector difference value; and
- predicting the current block using a motion vector corresponding to the index value and the motion vector difference value.

7. The method of claim 1, wherein decoding the current motion vector using the directional motion predictor is performed further in response to the reference picture having the first POC value correspond to a temporal reference picture.

8. The method of claim 1, wherein determining whether the first reference picture list for the current block includes the reference picture having the first POC value ascending order of reference index.

9. The method of claim 1, further comprising:
- in response to the first motion vector and the second motion vector having the same horizontal component and the same vertical component and having reference indices corresponding to the same picture, setting one of the first motion vector and the second motion vector to unavailable.

10. A method of encoding multiview video data, the method comprising:
- determining, for a current block in a current view, a corresponding block in a reference view using a disparity vector for the current block;
- determining a first motion prediction direction for a current motion vector of the current block;
- determining a first picture order count (POC) value of a first reference picture referenced by a reference index associated with a first motion vector of the corresponding block that points in the first motion prediction direction;
- determining whether a first reference picture list for the current block includes a reference picture having the first POC value, wherein the first reference picture list for the current block corresponds to the first motion prediction direction;
- in response to the first reference picture list for the current block including the reference picture having the first POC value, encoding the current motion vector using the first motion vector of the corresponding block as a directional motion predictor;
- in response to the first reference picture list for the current block not including the reference picture having the first POC value:
  - determining a second POC value of a second reference picture referenced by a reference index associated with a second motion vector of the corresponding block that points in a second motion prediction direction, wherein the second motion prediction direction is different than the first motion prediction direction;
  - determining whether the first reference picture list for the current block includes a reference picture having the second POC value; and
  - in response to the first reference picture list for the current block including the reference picture having the second POC value, encoding the current motion vector using the second motion vector of the corresponding block as the directional motion predictor.

11. The method of claim 10, further comprising:
- adding a merge candidate to a merge candidate list, wherein when the first reference picture list for the current block includes the reference picture having the first POC value, the merge candidate comprises a reference picture index corresponding to the reference picture having the first POC value and comprises the first motion vector, and when the first reference picture list for the current block does not include the reference picture having the first POC value, the merge candidate comprises a reference picture index corresponding to the reference picture having the second POC value and comprises the second motion vector;
- encoding an index value, wherein the index value corresponds to the merge candidate; and
- predicting the current block using the merge candidate corresponding to the index value.

12. The method of claim 11, further comprising:
- encoding the current motion vector using a motion vector predictor candidate, wherein the motion vector predictor candidate comprises the directional motion predictor and a second directional motion predictor.

13. The method of claim 10, wherein when the first reference picture list for the current block does not include the reference picture having the first POC value and when a second reference picture list for the current block does not include the reference picture having the second POC value, the method further comprises:
- determining whether a first POC difference, representing the difference between the first POC value and a first closest POC value for a reference picture in the first reference picture list for the current block to the first POC value, is greater than a second POC difference, representing the difference between the second POC value and a second closest POC value for a reference picture in the second reference picture list for the current block to the second POC value;
- when the first POC difference is greater than the second POC difference, scaling the first motion vector according to the first POC difference and encoding the current motion vector using the scaled first motion vector; and
- when the first POC difference is not greater than the second POC difference, scaling the second motion vector according to the second POC difference and encoding the current motion vector using the scaled second motion vector.

14. The method of claim 10, further comprising:
- including a motion vector predictor candidate as a merge candidate in a merge candidate list for the current block, wherein the motion vector predictor candidate comprises the directional motion predictor and a second directional motion predictor;
- encoding an index value, wherein the index value corresponds to the directional motion predictor; and
- predicting the current block using the merge candidate corresponding to the index value.

15. The method of claim 10, further comprising:
- including a motion vector of the directional motion predictor in a list of candidate motion vectors for an advanced motion vector prediction (AMVP) mode for the current block;
- encoding an index value, wherein the index value corresponds to a motion vector from the list of candidate motion vectors;
- encoding a motion vector difference value; and predicting the current block using a motion vector corresponding to the index value and the motion vector difference value.

16. The method of claim 10, wherein encoding the current motion vector using the directional motion predictor is performed further in response to the reference picture having the first POC value correspond to a temporal reference picture.

17. The method of claim 10, wherein determining whether the first reference picture list for the current block includes the reference picture having the first POC value comprises analyzing pictures in the first reference picture list for the current block in ascending order of reference index.

18. The method of claim 10, further comprising:
in response to the first motion vector and the second motion vector having the same horizontal component and the same vertical component and having reference indices corresponding to the same picture, setting one of the first motion vector and the second motion vector to unavailable.

19. A device for decoding multiview video data, the device comprising:
a memory configured to store the multiview video data; and
a video decoder comprising processing circuitry configured to determine, for a current block in a current view of the multiview video data, a corresponding block in a reference view using a disparity vector for the current block; determine a first motion prediction direction for a current motion vector of the current block; determine a first picture order count (POC) value of a first reference picture referenced by a reference index associated with a first motion vector of the corresponding block that points in the first motion prediction direction; determine whether a first reference picture list for the current block includes a reference picture having the first POC value, wherein the first reference picture list for the current block corresponds to the first motion prediction direction; in response to the first reference picture list for the current block including the reference picture having the first POC value, decode the current motion vector using the first motion vector of the corresponding block as a directional motion predictor; and, in response to the first reference picture list for the current block not including the reference picture having the first POC value: determine a second POC value of a second reference picture referenced by a reference index associated with a second motion vector of the corresponding block that points in a second motion prediction direction, wherein the second motion prediction direction is different than the first motion prediction direction; determine whether the first reference picture list for the current block includes a reference picture having the second POC value; and in response to the first reference picture list for the current block including the reference picture having the second POC value, decode the current motion vector using the second motion vector of the corresponding block as the directional motion predictor.

20. The device of claim 19, wherein the video decoder is further configured to add a merge candidate to a merge candidate list, wherein when the first reference picture list for the current block includes the reference picture having the first POC value, the merge candidate comprises a reference picture index corresponding to the reference picture having the first POC value and comprises the first motion vector, and when the first reference picture list for the current block does not include the reference picture having the first POC value the merge candidate comprises a reference picture index corresponding to the reference picture having the second POC value and comprises the second motion vector; decode an index value, wherein the index value corresponds to the merge candidate; and, predict the current block using the merge candidate corresponding to the index value.

21. The device of claim 20, wherein the video decoder is further configured to decode the current motion vector using a motion vector predictor candidate, wherein the motion vector predictor candidate comprises the directional motion predictor and a second directional motion predictor.

22. The device of claim 19, wherein the video decoder is configured such that, when the first reference picture list for the current block does not include the reference picture having the first POC value and when a second reference picture list for the current block does not include the reference picture having the second POC value, the video decoder:
determines whether a first POC difference, representing the difference between the first POC value and a first closest POC value for a reference picture in the first reference picture list for the current block to the first POC value, is greater than a second POC difference, representing the difference between the second POC value and a second closest POC value for a reference picture in the second reference picture list for the current block to the second POC value;
when the first POC difference is greater than the second POC difference, scales the first motion vector according to the first POC difference and decodes the current motion vector using the scaled first motion vector; and
when the first POC difference is not greater than the second POC difference, scales the second motion vector according to the second POC difference and decodes the current motion vector using the scaled second motion vector.

23. The device of claim 19, wherein the video decoder is configured to:
include a motion vector predictor candidate as a merge candidate in a merge candidate list for the current block, wherein the motion vector predictor candidate comprises the directional motion predictor and a second directional motion predictor;
decode an index value, wherein the index value corresponds to the directional motion predictor; and
predict the current block using the merge candidate corresponding to the index value.

24. The device of claim 19, wherein the video decoder is configured to:
include a motion vector of the directional motion predictor in a list of candidate motion vectors for an advanced motion vector prediction (AMVP) mode for the current block;
decode an index value, wherein the index value corresponds to a motion vector from the list of candidate motion vectors;
decode a motion vector difference value; and
predict the current block using a motion vector corresponding to the index value and the motion vector difference value.

25. The device of claim 19, wherein the video decoder is configured to decode the current motion vector using the directional motion predictor further in response to the reference picture having the first POC value correspond to a temporal reference picture.

26. The device of claim 19, wherein the video decoder is configured to determine whether the first reference picture list for the current block includes the reference picture having the first POC value by analyzing pictures in the first reference picture list for the current block in ascending order of the reference index.

27. The device of claim 19, wherein the video decoder is further configured to:
in response to the first motion vector and the second motion vector having the same horizontal component and the same vertical component and having reference indices corresponding to the same picture, set one of the first motion vector and the second motion vector to unavailable.

28. The device of claim 19, wherein the device comprises at least one of:
an integrated circuit;
a microprocessor; and, or
a wireless communication device that includes the video decoder.

29. A device for encoding multiview video data, the device comprising:
a memory configured to store the multiview video data;
a video encoder comprising processing circuitry configured to determine, for a current block in a current view of the multiview video data, a corresponding block in a reference view using a disparity vector for the current block; determine a first motion prediction direction for a current motion vector of the current block; determine a first picture order count (POC) value of a first reference picture referenced by a reference index associated with a first motion vector of the corresponding block that points in the first motion prediction direction; determine whether a first reference picture list for the current block includes a reference picture having the first POC value, wherein the first reference picture list for the current block corresponds to the first motion prediction direction; and, in response to the first reference picture list for the current block including the reference picture having the first POC value, encode the current motion vector using the first motion vector of the corresponding block as a directional motion predictor; in response to the first reference picture list for the current block not including the reference picture having the first POC value: determine a second POC value of a second reference picture referenced by a reference index associated with a second motion vector of the corresponding block that points in a second motion prediction direction, wherein the second motion prediction direction is different than the first motion prediction direction; determine whether the first reference picture list for the current block includes a reference picture having the second POC value; and in response to the first reference picture list for the current block including the reference picture having the second POC value, encode the current motion vector using the second motion vector of the corresponding block as the directional motion predictor.

30. The device of claim 29, wherein the video encoder is further configured to add a merge candidate to a merge candidate list, wherein when the first reference picture list for the current block includes the reference picture having the first POC value, the merge candidate comprises a reference picture index corresponding to the reference picture having the first POC value and comprises the first motion vector, and when the first reference picture list for the current block does not include the reference picture having the first POC value, the merge candidate comprises a reference picture index corresponding to the reference picture having the second POC value and comprises the second motion vector; encode an index value, wherein the index value corresponds to the merge candidate; and, predict the current block using the merge candidate corresponding to the index value.

31. The device of claim 30, wherein the video encoder is further configured to encode the current motion vector using a motion vector predictor candidate, wherein the motion vector predictor candidate comprises the directional motion predictor and a second directional motion predictor.

32. The device of claim 29, wherein the video encoder is configured such that, when the first reference picture list for the current block does not include the reference picture having the first POC value and when a second reference picture list for the current block does not include the reference picture having the second POC value, the video encoder:
determines whether a first POC difference, representing the difference between the first POC value and a first closest POC value for a reference picture in the first reference picture list for the current block to the first POC value, is greater than a second POC difference, representing the difference between the second POC value and a second closest POC value for a reference picture in the second reference picture list for the current block to the second POC value;
when the first POC difference is greater than the second POC difference, scales the first motion vector according to the first POC difference and encodes the current motion vector using the scaled first motion vector; and
when the first POC difference is not greater than the second POC difference, scales the second motion vector according to the second POC difference and encodes the current motion vector using the scaled second motion vector.

33. The device of claim 29, wherein the video encoder is configured to:
include a motion vector predictor candidate as a merge candidate in a merge candidate list for the current block, wherein the motion vector predictor candidate comprises the directional motion predictor and a second directional motion predictor;
encode an index value, wherein the index value corresponds to the directional motion predictor; and
predict the current block using the merge candidate corresponding to the index value.

34. The device of claim 29, wherein the video encoder is configured to:
include a motion vector of the directional motion predictor in a list of candidate motion vectors for an advanced motion vector prediction (AMVP) mode for the current block;
encode an index value, wherein the index value corresponds to a motion vector from the list of candidate motion vectors;
encode a motion vector difference value; and
predict the current block using a motion vector corresponding to the index value and the motion vector difference value.

35. The device of claim 29, wherein the video encoder is configured to encode the current motion vector using the directional motion predictor further in response to the reference picture having the first POC value correspond to a temporal reference picture.

36. The device of claim 29, wherein the video encoder is configured to determine whether the first reference picture list for the current block includes the reference picture having the first POC value by analyzing pictures in the first reference picture list i for the current block in ascending order of the reference index.

37. The device of claim 29, wherein the video encoder is further configured to:
in response to the first motion vector and the second motion vector having the same horizontal component and the same vertical component and having reference indices corresponding to the same picture, set one of the first motion vector and the second motion vector to unavailable.

38. The device of claim 29, wherein the device comprises at least one of:
an integrated circuit;
a microprocessor; and, or
a wireless communication device that includes the video encoder.

39. An apparatus for decoding multiview video data, the apparatus comprising:
means for determining, for a current block in a current view, a corresponding block in a reference view using a disparity vector for the current block;
means for determining a first motion prediction direction for a current motion vector of the current block;
means for determining a first picture order count (POC) value of a first reference picture referenced by a reference index associated with a first motion vector of the corresponding block that points in the first motion prediction direction;
means for determining whether a first reference picture list for the current block includes a reference picture having the first POC value, wherein the first reference picture list for the current block corresponds to the first motion prediction direction;
in response to the first reference picture list for the current block including the reference picture having the first POC value, decoding the current motion vector using the first motion vector of the corresponding block as a directional motion predictor;
means for determining a second POC value of a second reference picture referenced by a reference index associated with a second motion vector of the corresponding block that points in a second motion prediction direction in response to the first reference picture list for the current block not including the reference picture having the first POC value, wherein the second motion prediction direction is different than the first motion prediction direction;
means for determining whether the first reference picture list for the current block includes a reference picture having the second POC value; and
means for decoding the current motion vector using the second motion vector of the corresponding block as the directional motion predictor in response to the first reference picture list for the current block including the reference picture having the second POC value.

40. The apparatus of claim 39, further comprising:
means for adding a merge candidate to a merge candidate list, wherein when the first reference picture list for the current block includes the reference picture having the first POC value, the merge candidate comprises a reference picture index corresponding to the reference picture having the first POC value and comprises the first motion vector, and when the first reference picture list for the current block does not include the reference picture having the first POC value, the merge candidate comprises a reference picture index corresponding to the reference picture having the second POC value and comprises the second motion vector;
means for decoding an index value, wherein the index value corresponds to the merge candidate; and
means for predicting the current block using the merge candidate corresponding to the index value.

41. The apparatus of claim 40, further comprising:
means for decoding the current motion vector using a motion vector predictor candidate, wherein the motion vector predictor candidate comprises the directional motion predictor and a second directional motion predictor.

42. The apparatus of claim 39, wherein the apparatus further comprises:
means for determining, when the first reference picture list for the current block does not include the reference picture having the first POC value and when a second reference picture list for the current block does not include the reference picture having the second POC value,
whether a first POC difference, representing the difference between the first POC value and a first closest POC value for a reference picture in the first reference picture list for the current block to the first POC value, is greater than a second POC difference, representing the difference between the second POC value and a second closest POC value for a reference picture in the second reference picture list for the current block to the second POC value;
means for scaling, when the first reference picture list for the current block does not include the reference picture having the first POC value and when the second reference picture list for the current block does not include the reference picture having the second POC value, the first motion vector according to the first POC difference and decoding the current motion vector using the scaled first motion vector when the first POC difference is greater than the second POC difference; and
means for scaling, when the first reference picture list for the current block does not include the reference picture having the first POC value when the second reference picture list for the current block does not include the reference picture having the second POC value, and when the first POC difference is not greater than the second POC difference, the second motion vector according to the second POC difference and decoding the current motion vector using the scaled second motion vector.

43. The apparatus of claim 41, wherein the means for decoding the current motion vector using the motion vector predictor comprises 43, further comprising:
means for including a motion vector predictor candidate as a merge candidate in a merge candidate list for the current block, wherein the motion vector predictor candidate comprises the directional motion predictor and a second directional motion predictor;
means for decoding an index value, wherein the index value corresponds to the directional motion predictor; and
means for predicting the current block using the merge candidate corresponding to the index value.

44. The apparatus of claim 39, further comprising:
means for including a motion vector of the directional motion predictor in a list of candidate motion vectors for an advanced motion vector prediction (AMVP) mode for the current block;
means for decoding an index value, wherein the index value corresponds to a motion vector from the list of candidate motion vectors;

means for decoding a motion vector difference value; and means for predicting the current block using a motion vector corresponding to the index value and the motion vector difference value.

45. The apparatus of claim 39, wherein the means for decoding the current motion vector using the directional motion predictor decodes the current motion vector using the directional motion predictor in response to the reference picture having the first POC value correspond to a temporal reference picture.

46. The apparatus of claim 39, wherein the means for determining whether the first reference picture list for the current block for the current block includes the reference picture having the first POC value comprises analyzing pictures in the first reference picture list for the current block in ascending order of reference index.

47. The apparatus of claim 39, further comprising:

means for setting one of the first motion vector and the second motion vector to unavailable in response to the first motion vector and the second motion vector having the same horizontal component and the same vertical component and having reference indices corresponding to the same picture.

48. A non-transitory, computer-readable storage medium storing instructions that when executed by one or more processors cause the one or more processors to:

determine, for a current block in a current view, a corresponding block in a reference view using a disparity vector for the current block;

determine a first motion prediction direction for a current motion vector of the current block;

determine a first picture order count (POC) value of a first reference picture referenced by a reference index associated with a first motion vector of the corresponding block that points in the first motion prediction direction;

determine whether a first reference picture list for the current block includes a reference picture having the first POC value, wherein the first reference picture list for the current block corresponds to the first motion prediction direction;

code the current motion vector using the first motion vector of the corresponding block as a directional motion predictor in response to the first reference picture list for the current block including the reference picture having the first POC value;

in response to the first reference picture list for the current block not including the reference picture having the first POC value:

determine a second POC value of a second reference picture referenced by a reference index associated with a second motion vector of the corresponding block that points in a second motion prediction direction, wherein the second motion prediction direction is different than the first motion prediction direction;

determine whether the first reference picture list for the current block includes a reference picture having the second POC value;

encode the current motion vector using the second motion vector of the corresponding block as the directional motion predictor in response to the first reference picture list for the current block including the reference picture having the second POC value.

* * * * *